(12) United States Patent
Xing et al.

(10) Patent No.: US 11,215,796 B2
(45) Date of Patent: Jan. 4, 2022

(54) OPTICAL IMAGING LENS ASSEMBLY COMPRISING FIVE LENSES OF +−++− REFRACTIVE POWERS

(71) Applicant: ZHEJIANG SUNNY OPTICAL CO., LTD, Zhejiang (CN)

(72) Inventors: Tianxiang Xing, Zhejiang (CN); Jianke Wenren, Zhejiang (CN); Ming Li, Zhejiang (CN)

(73) Assignee: ZHEJIANG SUNNY OPTICAL CO., LTD., Zhejiang (CN)

( * ) Notice: Subject to any disclaimer, the term of this patent is extended or adjusted under 35 U.S.C. 154(b) by 0 days.

(21) Appl. No.: 16/489,705

(22) PCT Filed: Dec. 28, 2018

(86) PCT No.: PCT/CN2018/124911
§ 371 (c)(1),
(2) Date: Aug. 29, 2019

(87) PCT Pub. No.: WO2019/137246
PCT Pub. Date: Jul. 18, 2019

(65) Prior Publication Data
US 2020/0326509 A1    Oct. 15, 2020

(30) Foreign Application Priority Data

Jan. 9, 2018 (CN) .......................... 201810018932.7

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

| 9,784,949 B1 | 10/2017 | Wenren et al. | |
| 2012/0021802 A1* | 1/2012 | Sano | H04N 5/225 455/556.1 |
| 2014/0340568 A1* | 11/2014 | Sano | H04N 5/3572 348/360 |
| 2016/0161718 A1* | 6/2016 | Koreeda | G02B 13/0045 359/714 |

FOREIGN PATENT DOCUMENTS

| CN | 103827722 A | 5/2014 |
| CN | 107957620 A | 4/2018 |
| CN | 207780340 U | 8/2018 |
| JP | 2013156389 A | 8/2013 |

* cited by examiner

*Primary Examiner* — Wen Huang
(74) *Attorney, Agent, or Firm* — Gang Yu

(57) ABSTRACT

An embodiment of the present disclosure provides an optical imaging lens assembly, which sequentially includes, from an object side to an image side along an optical axis, a first lens, a second lens, a third lens, a fourth lens and a fifth lens with refractive power. The first lens has a positive refractive power, the fourth lens has a positive refractive power, and the fifth lens has a negative refractive power. An abbe number V1 of the first lens and an abbe number V2 of the second lens satisfy the following relationship 45<|V1−V2|<70.

18 Claims, 27 Drawing Sheets longitudinal aberration curve mm astigmatism curve mm distortion curve (percentage%)

longitudinal aberration curve astigmatism curve distortion curve longitudinal aberration curve astigmatism curve distortion curve longitudinal aberration curve astigmatism curve distortion curve longitudinal aberration curve astigmatism curve distortion curve (percentage%)

longitudinal aberration curve distortion curve lateral color curve

OPTICAL IMAGING LENS ASSEMBLY COMPRISING FIVE LENSES OF +−++− REFRACTIVE POWERS

CROSS-REFERENCE TO RELATED APPLICATIONS

The present disclosure claims priority to Chinese Patent Application No. 201810018932.7, submitted to the China National Intellectual Property Administration (CNIPA) on Jan. 9, 2018, and entitled "Optical imaging lens assembly", the contents of which are hereby incorporated by reference in its entirety.

TECHNICAL FIELD

Some embodiments of the application relate to an optical imaging lens assembly, and more particularly to an optical imaging lens assembly including five lenses.

BACKGROUND

A photosensitive element of a conventional imaging device is usually a Charge-Coupled Device (CCD) or a Complementary Metal-Oxide Semiconductor (CMOS). Performance improvement and size reduction of CCDs and CMOSs provide favorable conditions for development of optical imaging lens assembly. Meanwhile, the miniaturization development trend of electronic devices with imaging devices, for example, smart phones, makes higher requirements on miniaturization and high-quality imaging of optical imaging lens assembly of photographic devices.

SUMMARY

An embodiment of the present disclosure provides an optical imaging lens assembly with five lenses. The optical imaging lens assembly includes a first lens, a second lens, a third lens, a fourth lens and a fifth lens which are provided in sequence from an object side to an image side along an optical axis and have refractive powers. The first lens has a positive refractive power, the fourth lens has a positive refractive power, and the fifth lens has a negative refractive power. An abbe number V1 of the first lens and an abbe number V2 of the second lens satisfy the following relationship $45<|V1-V2|<70$.

In an exemplary embodiment, an effective focal length f3 of the third lens and an effective focal length f4 of the fourth lens satisfy the following relationship $1.5 \le f3/f4 \le 7.5$.

In an exemplary embodiment, an effective focal length f2 of the second lens and a radius of curvature R4 of an image-side surface of the second lens satisfy the following relationship $-4.5 \le f2/R4 < 0$.

In an exemplary embodiment, a refractive index N1 of the first lens and a refractive index N2 of the second lens satisfy the following relationship $0.3 \le |N1-N2| \le 0.5$.

In an exemplary embodiment, a center thickness CT3 of the third lens and a center thickness CT2 of the second lens satisfy the following relationship $1.5 \le CT3/CT2 \le 3$.

In an exemplary embodiment, an effective focal length f of the optical imaging lens assembly, an effective focal length f1 of the first lens and an effective focal length f5 of the fifth lens satisfy the following relationship $2 \le |f/f1|+|f/f5| \le 3$.

In an exemplary embodiment, a radius of curvature R1 of an object-side surface of the first lens and a radius of curvature R2 of an image-side surface of the first lens satisfy the following relationship $-1.65 \le (R1+R2)/(R1-R2) \le -0.95$.

In an exemplary embodiment, the effective focal length f of the optical imaging lens assembly and a center thickness CT5 of the fifth lens satisfy the following relationship $9.5 \le f/CT5 \le 18$.

In an exemplary embodiment, an effective focal length f4 of the fourth lens and a radius of curvature R8 of an image-side surface of the fourth lens satisfy the following relationship $0.5 \le |f4/R8| < 2$.

In an exemplary embodiment, an axial distance TTL from an object-side surface of the first lens to an imaging surface and a half of a diagonal length ImgH of an effective pixel region on the imaging surface satisfy the following relationship $TTL/ImgH \le 1.5$.

In an exemplary embodiment, a combined focal length f12 of the first lens and the second lens and a combined focal length f45 of the fourth lens and the fifth lens satisfy the following relationship $-2.5 \le f45/f12 \le -1$.

In an exemplary embodiment, an effective focal length f of the optical imaging lens assembly, an effective focal length f1 of the first lens and an effective focal length f2 of the second lens satisfy the following relationship $1 \le |f/f1|+|f/f2| \le 2$.

In an exemplary embodiment, a radius of curvature R3 of an object-side surface of the second lens and a radius of curvature R4 of an image-side surface of the second lens satisfy the following relationship $0 \le (R3+R4)/(R3-R4) \le 5.5$.

In an exemplary embodiment, an effective focal length f of the optical imaging lens assembly, a center thickness CT3 of the third lens, a center thickness CT4 of the fourth lens and a center thickness CT5 of the fifth lens satisfy the following relationship $2 \le f/(CT3+CT4+CT5) \le 3.5$.

In an exemplary embodiment, the first lens and the second lens are made of glass.

In an exemplary embodiment, a transmittance $T_{500-700}$ of the first lens and the second lens in a waveband 500-700 nm satisfies the following relationship $0.89 < T_{500-700} < 0.995$.

In an exemplary embodiment, a transmittance $T_{700-850}$ of the first lens and the second lens in a waveband 700-850 nm satisfies the following relationship $0.98 < T_{700-850} < 0.998$.

Another embodiment of the present disclosure provides optical imaging lens assembly with five lenses. The optical imaging lens assembly includes a first lens, a second lens, a third lens, a fourth lens and a fifth lens which are provided in sequence from an object side to an image side along an optical axis and have refractive powers. The first lens has a positive refractive power, an image-side surface of the third lens is a convex surface, the fourth lens has a positive refractive power, the fifth lens has a negative refractive power, and an image-side surface of the fifth lens is a concave surface. An abbe number V1 of the first lens and an abbe number V2 of the second lens satisfy the following relationship $45<|V1-V2|<70$.

In an exemplary embodiment, the second lens has a negative refractive power, and the third lens has a positive refractive power.

In an exemplary embodiment, an object-side surface of the first lens is a convex surface, an image-side surface of the second lens is a concave surface, and an image-side surface of the fourth lens is a convex surface.

According to some embodiment of the present disclosure, the five lenses are adopted, and a surface type, an abbe number, a refractive index, an effective focal length and a center thickness of each lens, on-axis distances between the lenses and the like are reasonably configured to achieve at least one beneficial effect of super thinness, miniaturization, large aperture, high imaging quality and the like of the optical imaging lens assembly.

BRIEF DESCRIPTION OF THE DRAWINGS

Detailed descriptions are made to unrestrictive implementation modes below in combination with the drawings to make the other characteristics, purposes and advantages of the application more apparent. In the drawings.

DETAILED DESCRIPTION OF THE EMBODIMENTS

Figure 1:
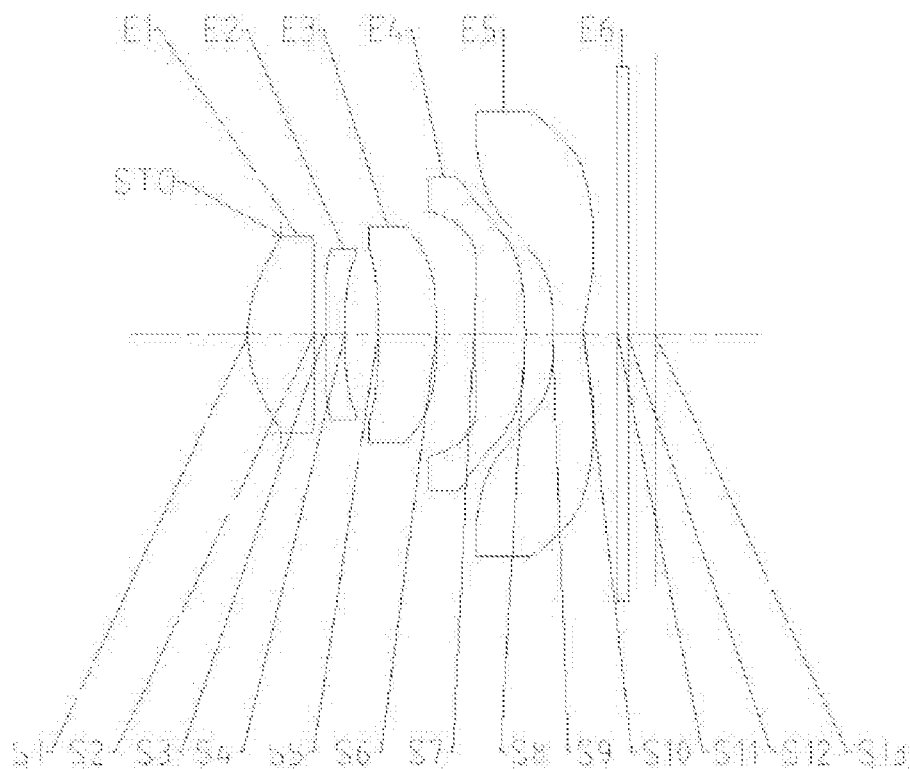
FIG. 1 is a schematic structure diagram of an optical imaging lens assembly according to embodiment 1 of the application.

For understanding the application better, more detailed descriptions will be made to each aspect of the application with reference to the drawings. It is to be understood that these detailed descriptions are only descriptions about the exemplary implementations of the application and not intended to limit the scope of the application in any manner. In the whole specification, the same reference sign numbers represent the same components. Expression "and/or" includes any or all combinations of one or more in associated items which are listed.

It is to be noted that, in the specification, expressions like first, second and third are adopted not to represent any limit to characteristics but only to distinguish one characteristic from another characteristic. Therefore, a first lens discussed below may also be called a second lens or a third lens under the condition of not departing from the teachings of the application.

For convenient description, thicknesses, sizes and shapes of lenses are slightly magnified in the drawings. Specifically, spherical or aspherical shapes in the drawings are shown exemplarily. That is, spherical or aspherical shapes are not limited to the spherical or aspherical shapes shown in the drawings. The drawings are drawn only exemplarily but not strictly to scale.

In the application, a paraxial region refers to a region nearby an optical axis. If a surface of a lens is a convex surface and a position of the convex surface is not defined, it is indicated that at least a paraxial region of the surface of the lens is a convex surface; and if a surface of a lens is a concave surface and a position of the concave surface is not defined, it is indicated that at least a paraxial region of the surface of the lens is a concave surface. A surface, closest to an object, in each lens is called an object-side surface, and a surface, closest to an imaging surface, in each lens is called an image-side surface.

It is also to be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in" may appear after a list of listed characteristics not to modify an individual component in the list but to modify the listed characteristics. Moreover, when the implementations of the application are described, "may" is used to represent "one or more implementations of the application". Furthermore, term "exemplary" refers to an example or illustration.

Unless otherwise defined, all terms (including technical terms and scientific terms) used in the application have the same meanings usually understood by those of ordinary skill in the art of the application. It is also to be understood that the terms (for example, terms defined in a common dictionary) should be explained to have meanings consistent with the meanings in the context of a related art and may not be explained with ideal or excessively formal meanings, unless clearly defined like this in the application.

It is to be noted that the embodiments in the application and characteristics in the embodiments may be combined without conflicts. The application will be described below with reference to the drawings and in combination with the embodiments in detail.

The characteristics, principles and other aspects of the application will be described below in detail.

An optical imaging lens assembly according to an exemplary implementation of the application may include, for example, five lenses with refractive power, i.e., a first lens, a second lens, a third lens, a fourth lens and a fifth lens. The five lenses are sequentially arranged from an object side to an image side along an optical axis.

In the exemplary implementation, the first lens may have a positive refractive power, the fourth lens may have a positive refractive power, and the fifth lens may have a negative refractive power. In addition, the second lens may have a negative refractive power, and the third lens may have a positive refractive power.

In the exemplary implementation, an object-side surface of the first lens may be a convex surface, an image-side surface of the second lens may be a concave surface, an image-side surface of the third lens may be a convex surface, an image-side surface of the fourth lens may be a convex surface, and an image-side surface of the fifth lens may be a concave surface.

In the exemplary implementation, an abbe number V1 of the first lens and an abbe number V2 of the second lens may satisfy the following relationship 45<|V1−V2|<70. Specifically, V1 and V2 may satisfy the following relationship 47.95≤|V1−V2|≤62.24. Configuring abbe numbers of the two lenses within such a numerical interval may correct a chromatic aberration of the optical imaging lens assembly better.

In the exemplary implementation, the first lens and the second lens may be made of glass. Compared with a plastic material, glass is greater in abbe number difference value, higher in transmittance and lower in thermal expansion coefficient. Reasonably matching a material for the two lenses may reasonably allocate focal lengths of the two lenses, reduce a deflection angle of light and reduce sensitivity of the optical imaging lens assembly. In addition, increasing an abbe number difference value may decrease a relative refractive power of the first lens and the second lens to effectively reduce a spherical aberration of the optical imaging lens assembly.

In the exemplary implementation, an effective focal length f3 of the third lens and an effective focal length f4 of the fourth lens may satisfy the following relationship 1.5≤f3/f4≤7.5. Specifically, f3 and f4 may satisfy the following relationship 1.97≤f3/f4≤7.36. Matching the effective focal lengths of the third lens and the fourth lens according to such a relationship may reduce the deflection angle of the light, thereby improving imaging quality of the optical imaging lens assembly.

In the exemplary implementation, an effective focal length f2 of the second lens and a radius of curvature R4 of an image-side surface of the second lens may satisfy the following relationship −4.5≤f2/R4<0. Specifically, f2 and R4 may satisfy the following relationship −4.11≤f2/R4≤−0.81. Controlling a ratio of the effective focal length of the second lens to the radius of curvature of the image-side surface within such a range may control a deflection angle of an edge field of view at the second lens, thereby effectively reducing the sensitivity of the optical imaging lens assembly.

In the exemplary implementation, a refractive index N1 of the first lens and a refractive index N2 of the second lens may satisfy the following relationship 0.3≤|N1−N2|≤0.5. Specifically, N1 and N2 may satisfy the following relationship 0.32≤|N1−N2|≤0.5. Configuring the refractive indexes of the two lenses within such a numerical interval may achieve a relatively high positive and negative refractive power and correct the spherical aberration of the optical imaging lens assembly more effectively.

In the exemplary implementation, a center thickness CT3 of the third lens and a center thickness CT2 of the second lens may satisfy the following relationship 1.5≤CT3/CT2≤3. Specifically, CT3 and CT2 may satisfy the following relationship 1.84≤CT3/CT2≤2.96. Configuring thicknesses of the second lens and the third lens to be matched according to such a relationship may endow the optical imaging lens assembly with a relatively high aberration balancing capability.

In the exemplary implementation, an effective focal length f of the optical imaging lens assembly, an effective focal length f1 of the first lens and an effective focal length f5 of the fifth lens may satisfy the following relationship 2≤|f/f1|+|f/f5|≤3. Specifically, f, f1 and f5 may satisfy the following relationship 2.44≤|f/f1|+|f/f5|≤2.90. Matching the refractive power of the first lens and the fifth lens and the refractive power of the optical imaging lens assembly according to such a relationship may reduce the deflection angle of the light, thereby reducing the sensitivity of the optical imaging lens assembly.

In the exemplary implementation, a radius of curvature R1 of an object-side surface of the first lens and a radius of curvature R2 of an image-side surface of the first lens may satisfy the following relationship −1.65≤(R1+R2)/(R1−R2)≤−0.95. In at least one exemplary embodiment, R1 and R2 may satisfy the following relationship −1.64≤(R1+R2)/(R1−R2)≤−0.98. Restricting the radiuses of curvature of the surfaces of the first lens within such a range may control the deflection angle of the light here, thereby effectively reducing the sensitivity of the optical imaging lens assembly.

In the exemplary implementation, an effective focal length f of the optical imaging lens assembly and a center thickness CT5 of the fifth lens may satisfy the following relationship 9.5≤f/CT5≤18. In at least one exemplary embodiment, f and CT5 may satisfy the following relationship $9.74 \leq f/CT5 \leq 17.93$. Controlling a ratio of the effective focal length of the optical imaging lens assembly and the center thickness of the fifth lens within such a range may effectively control astigmatism of the optical imaging lens assembly.

In the exemplary implementation, an effective focal length f4 of the fourth lens and a radius of curvature R8 of an image-side surface of the fourth lens may satisfy the following relationship $0.5 \leq |f4/R8| < 2$. Specifically, f4 and R8 may satisfy the following relationship $0.51 \leq |f4/R8| \leq 1.84$. Controlling a ratio of the effective focal length of the fourth lens to the radius of curvature of the image-side surface within such a range may control the deflection angle of the edge field of view at the fourth lens, thereby effectively reducing the sensitivity of the optical imaging lens assembly.

In the exemplary implementation, a TTL from an object-side surface to an imaging surface of the first lens and a half of a diagonal length ImgH of an effective pixel region on the imaging surface may satisfy the following relationship $TTL/ImgH \leq 1.5$. Specifically, the TTL and ImgH may satisfy the following relationship $TTL/ImgH \leq 1.49$. Such a configuration is made to effectively reduce a size of the optical imaging lens assembly and ensure the characteristic of compact size of the optical imaging lens assembly.

In the exemplary implementation, a combined focal length f12 of the first lens and the second lens and a combined focal length f45 of the fourth lens and the fifth lens may satisfy the following relationship $-2.5 \leq f45/f12 \leq -1$. Specifically, f12 and f45 may satisfy the following relationship $-2.31 \leq f45/f12 \leq -1.01$. Configuring the combined focal lengths within such an interval may effectively correct the aberration of the optical imaging lens assembly.

In the exemplary implementation, an effective focal length f of the optical imaging lens assembly, an effective focal length f1 of the first lens and an effective focal length f2 of the second lens may satisfy the following relationship $1 \leq |f/f1|+|f/f2| \leq 2$. Specifically, f, f1 and f2 may satisfy the following relationship $1.31 \leq |f/f1|+|f/f2| \leq 1.87$. Configuring the effective focal lengths of the first lens and the second lens within such an interval may endow the optical imaging lens assembly with a relatively high field curvature balancing capability.

In the exemplary implementation, a radius of curvature R3 of an object-side surface of the second lens and a radius of curvature R4 of the image-side surface of the second lens may satisfy the following relationship $0 \leq (R3+R4)/(R3-R4) \leq 5.5$. Specifically, R3 and R4 may satisfy the following relationship $0.35 \leq (R3+R4)/(R3-R4) \leq 5.27$. Controlling the radiuses of curvature of the surfaces of the second lens within such a range may balance the aberration of the optical imaging lens assembly more easily, thereby improving the imaging quality of the optical imaging lens assembly.

In the exemplary implementation, the effective focal length f of the optical imaging lens assembly, the center thickness CT3 of the third lens, a center thickness CT4 of the fourth lens and the center thickness CT5 of the fifth lens may satisfy the following relationship $2 \leq f/(CT3+CT4+CT5) \leq 3.5$. Specifically, f, CT3, CT4 and CT5 may satisfy the following relationship $2.39 \leq f/(CT3+CT4+CT5) \leq 3.2$. Setting thicknesses of the last three lenses of the optical imaging lens assembly within such a range may effectively correct a field curvature and aberration of the optical imaging lens assembly.

In the exemplary implementation, a transmittance $T_{500-700}$ of the first lens and the second lens in a waveband 500-700 nm satisfy the following relationships $0.89 < T_{500-700} < 0.995$. In addition, the transmittance $T_{700-850}$ of the first lens and the second lens in a waveband 700-850 nm satisfy the following relationships $0.98 < T_{700-850} < 0.998$. Reasonably configuring the transmittance of the first lens and the second lens may improve relative illuminance of the optical imaging lens assembly.

In the exemplary implementation, the optical imaging lens assembly may further include at least one diaphragm to improve the imaging quality of the lens assembly. For example, the diaphragm may be arranged before the first lens or arranged on the first lens.

Optionally, the optical imaging lens assembly may further include an optical filter configured to correct the chromatic aberration and/or protective glass configured to protect a photosensitive element on the imaging surface.

The optical imaging lens assembly according to the exemplary implementations of the application may adopt multiple lenses, for example, the abovementioned five. A surface type, an effective focal length and a center thickness of each lens, on-axis distances between the lenses and the like are reasonably configured to effectively reduce a size of the lens assembly, reduce sensitivity of the lens assembly, improve manufacturability of the lens assembly and ensure that the optical imaging lens assembly is more favorable for production and processing and may be applied to a portable electronic product. In addition, the abbe number, the refractive index and the like of each lens are also reasonably allocated to achieve high imaging quality.

In the exemplary implementation of the application, at least one of mirror surfaces of the lenses is an aspherical mirror surface. The aspherical mirror surface has the characteristic that the curvature keeps changing from a center of the lens to a periphery of the lens. Unlike a spherical lens with a constant curvature from a center of the lens to a periphery of the lens, an aspherical lens has a better radius of curvature characteristic and the advantages of improving distortion and improving aberrations. With adoption of the aspherical lens, the aberrations during imaging may be eliminated as much as possible, thereby improving the imaging quality.

However, those skilled in the art should know that the number of the lenses forming the optical imaging lens assembly may be changed without departing from the technical solutions claimed in the application to achieve each result and advantage described in the specification. For example, although descriptions are made in the implementation with five lenses as an example, the optical imaging lens assembly is not limited to five lenses. If necessary, the optical imaging lens assembly may further include another number of lenses.

Specific embodiments of the optical imaging lens assembly applied to the abovementioned implementation mode will further be described below with reference to the drawings.

Embodiment 1

An optical imaging lens assembly according to embodiment 1 of the application will be described below with reference to FIG. 1 to FIG. 2D. FIG. 1 is a schematic structure diagram of an optical imaging lens assembly according to embodiment 1 of the application.

As shown in FIG. 1, the optical imaging lens assembly according to an exemplary implementation of the application includes a diaphragm STO, a first lens E1, a second lens E2, a third lens E3, a fourth lens E4, a fifth lens E5, an optical filter E6 and an imaging surface S13 which are provided in sequence from an object side to an image side along an optical axis.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a concave surface, and an image-side surface S6 is a convex surface. The fourth lens E4 has a positive refractive power, an object-side surface S7 thereof is a convex surface, and an image-side surface S8 is a convex surface. The fifth lens E5 has a negative refractive power, an object-side surface S9 thereof is a convex surface, and an image-side surface S10 is a concave surface. The optical filter E6 has an object-side surface S11 and an image-side surface S12. Light from an object sequentially penetrates through each of the surfaces S1 to S12 and is finally image on the imaging surface S13.

Table 1 shows the surface type, the radius of curvature, the thickness, the material and the conic coefficient of each lens of the optical imaging lens assembly according to embodiment 1. Units of the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.3485 | | | |
| S1 | Aspherical | 1.5654 | 0.7040 | 1.59 | 67.4 | −0.5561 |
| S2 | Aspherical | 6.9101 | 0.1142 | | | 31.8724 |
| S3 | Aspherical | 11.0853 | 0.2100 | 2.00 | 19.3 | −99.0000 |
| S4 | Aspherical | 5.2172 | 0.3597 | | | 31.0575 |
| S5 | Aspherical | −15.0065 | 0.6221 | 1.54 | 56.1 | −99.0000 |
| S6 | Aspherical | −7.5841 | 0.3987 | | | 31.2059 |
| S7 | Aspherical | 4.3800 | 0.5422 | 1.54 | 56.1 | 8.758 |
| S8 | Aspherical | −5.5597 | 0.2909 | | | 8.9429 |
| S9 | Aspherical | 19.1787 | 0.3442 | 1.54 | 55.7 | 84.0236 |
| S10 | Aspherical | 1.3010 | 0.3534 | | | −8.7884 |
| S11 | Spherical | Infinite | 0.1100 | 1.52 | 64 2 | |
| S12 | Spherical | Infinite | | | | |
| S13 | Spherical | Infinite | | | | |

From Table 1 it can be seen that both the object-side surface and image-side surface of any lens in the first lens E1 to the fifth lens E5 are aspherical surfaces. In the embodiment, the surface type x of each aspherical lens may be defined by use of, but not limited to, the following aspherical surface formula:

$$x = \frac{ch^2}{1 + \sqrt{1 - (k+1)c^2h^2}} + \sum A_i h^i, \quad (1)$$

Here, x is the sag—the axis-component of the displacement of the surface from the aspheric vertex, when the surface is at a height h from the optical axis; c is a paraxial curvature of the aspherical surface, c=1/R (i.e., the paraxial curvature c is the reciprocal of the radius of curvature R in Table 1); k is the conic coefficient (given in Table 1); and Ai is the correction coefficient of the order of aspheric surface. Table 2 shows high-order coefficients $A_4$, $A_6$, $A_8$, $A_{10}$, $A_{12}$, $A_{14}$, $A_{16}$, $A_{18}$ and $A_{20}$ applied to the aspherical mirror surfaces S1-S14 in embodiment 1.

TABLE 2

| Surface number | A4 | A6 | A8 | A10 | A12 | A14 | A16 | A18 | A20 |
|---|---|---|---|---|---|---|---|---|---|
| S1 | 9.9552E−03 | −2.5873E−03 | −3.8384E−04 | −2.6749E−02 | 3.4884E−02 | −3.2355E−02 | 8.7106E−.03 | 0.0000E+00 | 0.0000E+00 |
| S2 | 1.3605E−01 | 8.3061E−02 | 4.5887E−02 | −3.6706E−01 | 5.5513E−01 | −3.8851E−01 | 1.0430E−01 | 0.0000E+00 | 0.0000E+00 |
| S3 | −1.0075E−01 | 2.5647E−01 | 3.7255E−02 | −6.5372E−01 | 1.1144E+00 | −8.3976E−01 | 2.4890E−01 | 0.0000E+00 | 0.0000E+00 |
| S4 | −5.7339E−02 | 1.4046E−01 | 5.1703E−01 | −1.9733E+00 | 3.1131E+00 | −2.2922E+00 | 6.1838E−01 | 0.0000E+00 | 0.0000E+00 |
| S5 | −1.6276E−01 | 5.0163E−01 | −3.3617E+00 | 1.4502E+01 | −3.9800E+01 | 6.9229E+01 | −7.3702E+01 | 4.3670E+01 | −1.0954E+01 |
| S6 | −1.3005E−01 | −1.4270E−01 | 8.7901E−01 | −2.7324E+00 | 5.1910E+00 | −6.1448E+00 | 4.4232E+00 | −1.7753E+00 | 3.0591E−01 |
| S7 | −9.3350E−02 | 7.1276E−03 | −3.8619E−01 | 1.0133E+00 | −1.5790E+00 | 1.5021E+00 | −8.6217E−01 | 2.7406E−01 | −3.7322E−02 |
| S8 | −3.3920E−02 | −2.4773E−02 | −1.4432E−01 | 2.3644E−01 | −2.0028E−01 | 1.1320E−01 | −3.9318E−02 | 7.3070E−03 | −5.5087E−04 |

TABLE 2-continued

| Surface number | A4 | A6 | A8 | A10 | A12 | A14 | A16 | A18 | A20 |
|---|---|---|---|---|---|---|---|---|---|
| S9 | −6.6054E−01 | 5.4759E−01 | −4.8064E−01 | 4.1943E−01 | −2.3634E−01 | 7.9645E−02 | −1.5802E−02 | 1.7151E−03 | −7.8897E−05 |
| S10 | −2.3468E−01 | 1.5497E−01 | −5.4178E−02 | 8.9016E−03 | 4.1488E−04 | −5.8470E−04 | 1.3766E−04 | −1.5124E−05 | 6.6351E−07 |

Each parameter of the optical imaging lens assembly in embodiment 1 is configured as follows.

Effective focal lengths f1 to f5 of the first lens to the fifth lens are 3.24, −9.93, 27.28, 4.58 and −2.62 respectively. An effective focal length f of the optical imaging lens assembly is 3.60. A TTL of the optical imaging lens assembly is 4.34, and a half of a diagonal length ImgH of an effective pixel region on the imaging surface S13 of the optical imaging lens assembly is 3.

An abbe number V1 of the first lens and an abbe number V2 of the second lens satisfy the following relationship |V1−V2|=47.95. The effective focal length f3 of the third lens and the effective focal length f4 of the fourth lens satisfy the following relationship f3/f4=5.96. The effective focal length f2 of the second lens and the radius of curvature R4 of the image-side surface of the second lens satisfy the following relationship f2/R4=−1.90. A refractive index N1 of the first lens and a refractive index N2 of the second lens satisfy the following relationship |N1−N2|=0.41. A center thickness CT3 of the third lens and a center thickness CT2 of the second lens satisfy the following relationship CT3/CT2=2.96. The effective focal length f of the optical imaging lens assembly, the effective focal length f1 of the first lens and the effective focal length f5 of the fifth lens satisfy the following relationship |f/f1|+|f/f5 |=2.49. The radius of curvature R1 of the object-side surface of the first lens and the radius of curvature R2 of the image-side surface of the first lens satisfy the following relationship (R1+R2)/(R1−R2)=−1.59. The effective focal length f of the optical imaging lens assembly and a center thickness CT5 of the fifth lens satisfy the following relationship f/CT5=10.46. The effective focal length f4 of the fourth lens and the radius of curvature R8 of the image-side surface of the fourth lens satisfy the following relationship |f4/R8|=0.82. A TTL from the object-side surface of the first lens to an imaging surface and a half of a diagonal length ImgH of the effective pixel region on the imaging surface satisfy the following relationship TTL/ImgH=1.45. A combined focal length f12 of the first lens and the second lens and a combined focal length f45 of the fourth lens and the fifth lens satisfy the following relationship f45/f12 =−2.29. The effective focal length f of the optical imaging lens assembly, the effective focal length f1 of the first lens and the effective focal length f2 of the second lens satisfy the following relationship |f/f1|+|f/f2 |=1.48. The radius of curvature R3 of the object-side surface of the second lens and the radius of curvature R4 of the image-side surface of the second lens satisfy the following relationship (R3+R4)/(R3−R4)=2.78. The effective focal length f of the optical imaging lens assembly, the center thickness CT3 of the third lens, a center thickness CT4 of the fourth lens and the center thickness CT5 of the fifth lens satisfy the following relationship f/(CT3+CT4+CT5)=2.39.

Figure 2A:
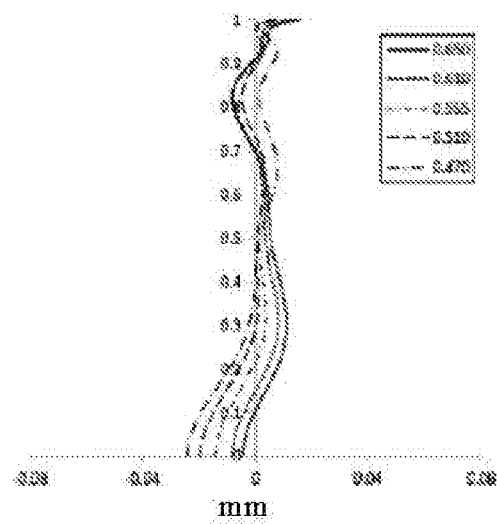
FIG. 2A to FIG. 2D illustrate a longitudinal aberration curve, an astigmatism curve, a distortion curve and a lateral color curve of an optical imaging lens assembly respectively according to embodiment 1.
Figure 2B:
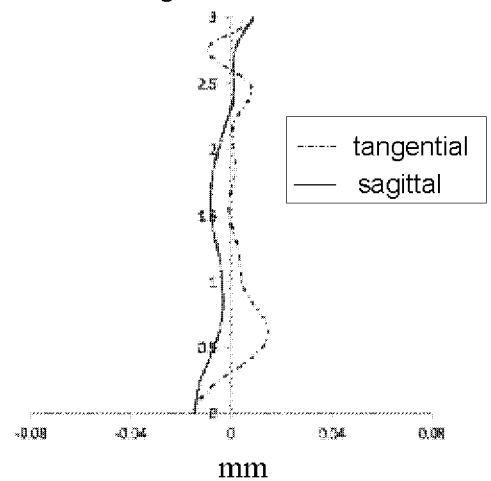
Figure 2C:
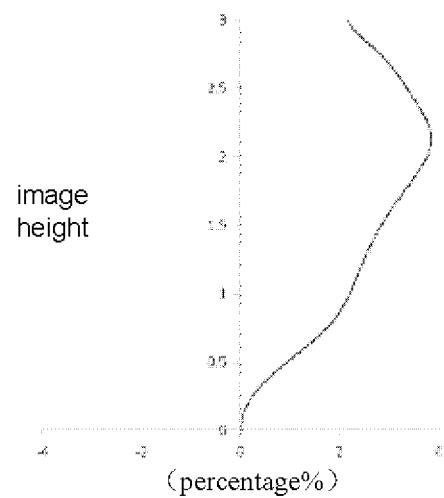
Figure 2D:
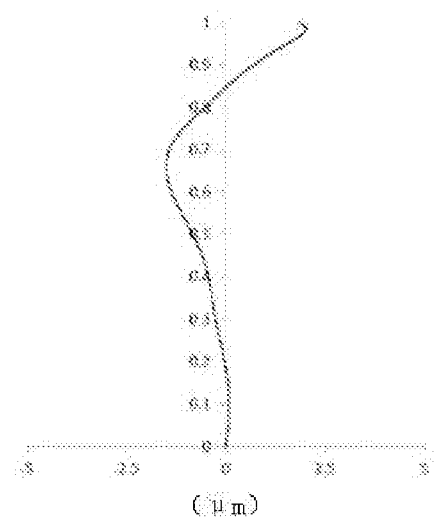

In addition, FIG. 2A illustrates a longitudinal aberration curve of the optical imaging lens assembly according to embodiment 1 to represent deviation of a convergence focal point after light with different wavelengths passes through the lens. FIG. 2B illustrates an astigmatism curve of the optical imaging lens assembly according to embodiment 1 to represent a tangential image surface curvature and a sagittal image surface curvature. FIG. 2C illustrates a distortion curve of the optical imaging lens assembly according to embodiment 1 to represent a distortion value under different viewing angles. FIG. 2D illustrates a lateral color curve of the optical imaging lens assembly according to embodiment 1 to represent deviation of different image heights on the imaging surface after the light passes through the lens. According to FIG. 2A to FIG. 2D, it can be seen that the optical imaging lens assembly provided in embodiment 1 can achieve high imaging quality.

Embodiment 2

Figure 3:
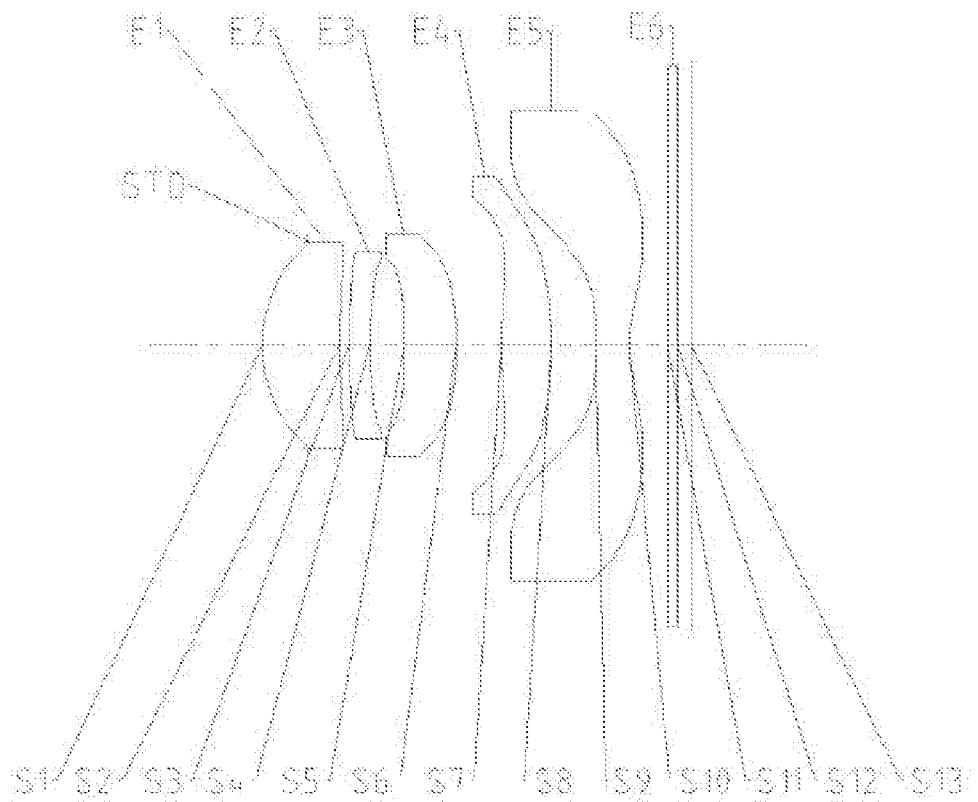
FIG. 3 is a schematic structure diagram of an optical imaging lens assembly according to embodiment 2 of the application.

An optical imaging lens assembly according to embodiment 2 of the application will be described below with reference to FIG. 3 to FIG. 4D. In the embodiment and the following embodiments, part of descriptions similar to the embodiment 1 are omitted for simplicity. FIG. 3 is a schematic structure diagram of an optical imaging lens assembly according to embodiment 2 of the application.

As shown in FIG. 3, the optical imaging lens assembly according to an exemplary implementation of the application includes a diaphragm STO, a first lens E1, a second lens E2, a third lens E3, a fourth lens E4, a fifth lens E5, an optical filter E6 and an imaging surface S13 which are provided in sequence from an object side to an image side along an optical axis.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a concave surface, and an image-side surface S6 is a convex surface. The fourth lens E4 has a positive refractive power, an object-side surface S7 thereof is a convex surface, and an image-side surface S8 is a convex surface. The fifth lens E5 has a negative refractive power, an object-side surface S9 thereof is a concave surface, and an image-side surface S10 is a concave surface. The optical filter E6 has an object-side surface S11 and an image-side surface S12. Light from an object sequentially penetrates through each of the surfaces S1 to S12 and is finally image on the imaging surface S13.

Table 3 shows the surface type, the radius of curvature, the thickness, the material and the conic coefficient of each lens of the optical imaging lens assembly according to embodiment 2. Units of the radius of curvature and the thickness are millimeter (mm).

TABLE 3

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −0.4560 | | | |
| S1 | Aspherical | 1.4479 | 0.7878 | 1.50 | 81.6 | −0.0887 |
| S2 | Aspherical | 5.9735 | 0.1000 | | | 29.1902 |
| S3 | Aspherical | 5.9463 | 0.2100 | 2.00 | 19.3 | 29.5668 |
| S4 | Aspherical | 3.9188 | 0.3532 | | | 4.7073 |
| S5 | Aspherical | −9.0688 | 0.5344 | 1.54 | 56.1 | 86.4881 |
| S6 | Aspherical | −4.6189 | 0.4633 | | | 14.2283 |
| S7 | Aspherical | 6.4148 | 0.5084 | 1.54 | 56.1 | −7.3383 |
| S8 | Aspherical | −3.9968 | 0.4536 | | | 0.9865 |
| S9 | Aspherical | −500.0000 | 0.3500 | 1.54 | 55.7 | −99.0000 |
| S10 | Aspherical | 1.2334 | 0.3903 | | | −7.6861 |
| S11 | Spherical | Infinite | 0.1100 | 1.52 | 64.2 | |
| S12 | Spherical | Infinite | 0.1391 | | | |
| S13 | Spherical | Infinite | | | | |

Table 4 shows higher-order coefficients applied to each aspherical mirror surface in embodiment 2. The surface type of each aspherical surface may be defined by formula (1) given in embodiment 1.

TABLE 4

| Surface number | A4 | A6 | A8 | A10 | A12 | A14 | A16 | A18 | A20 |
|---|---|---|---|---|---|---|---|---|---|
| S1 | 3.5149E−03 | 1.4944E−02 | −3.6422E−02 | 7.1458E−02 | −7.1723E−02 | 3.5097E−02 | −2.7815E−03 | −3.3078E−03 | 0.0000E+00 |
| S2 | −9.6885E−02 | 1.7893E−02 | 3.9323E−01 | −1.7563E+00 | 4.2179E+00 | −6.1901E+00 | 5.2860E+00 | −2.3506E+00 | 4.0155E−01 |
| S3 | −1.3203E−01 | 1.6232E−01 | −1.9683E−01 | 4.5768E−01 | −8.5785E−01 | 7.5392E−01 | −2.0389E−01 | −3.5052E−02 | 0.0000E+00 |
| S4 | −7.2662E−02 | 1.1754E−01 | 9.1201E−02 | −6.1013E−01 | 1.4707E+00 | −1.9194E+00 | 1.2410E+00 | −2.4023E−01 | 0.0000E+00 |
| S5 | −1.0417E−01 | −1.3756E−01 | 9.9194E−01 | −5.1075E+00 | 1.5865E+01 | −3.1056E+01 | 3.7143E+01 | −2.4933E+01 | 7.2334E+00 |
| S6 | −9.8311E−02 | −3.4731E−02 | 1.2910E−01 | −4.1369E−01 | 9.0217E−01 | −1.2859E+00 | 1.1462E+00 | −5.7877E−01 | 1.2801E−01 |
| S7 | −1.1043E−02 | −6.1067E−02 | 8.1105E−02 | −1.5865E−01 | 1.8295E−01 | −1.2764E−01 | 5.4191E−02 | −1.2902E−02 | 1.3163E−03 |
| S8 | 2.3532E−02 | −7.4244E−03 | −4.6335E−02 | 4.0627E−02 | −3.1293E−02 | 2.1937E−02 | −8.5234E−03 | 1.5618E−03 | −1.0594E−04 |
| S9 | −5.9019E−01 | 6.1809E−01 | −5.1371E−01 | 2.7875E−01 | −8.2270E−02 | 1.0452E−02 | 3.2775E−04 | −2.1716E−04 | 1.5516E−05 |
| S10 | −2.2822E−01 | 2.2308E−01 | −1.5677E−01 | 7.4293E−02 | −2.3260E−02 | 4.7340E−03 | −6.0453E−04 | 4.4082E−05 | −1.3989E−06 |

Figure 4A:
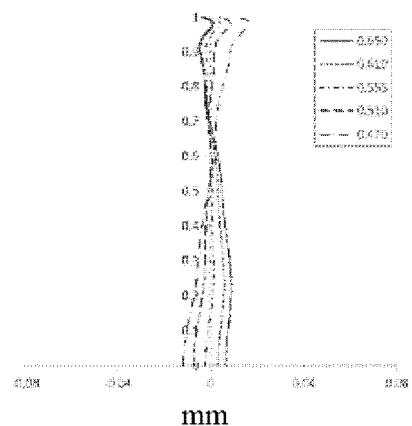
FIG. 4A to FIG. 4D illustrate a longitudinal aberration curve, an astigmatism curve, a distortion curve and a lateral color curve of an optical imaging lens assembly respectively according to embodiment 2.
Figure 4B:
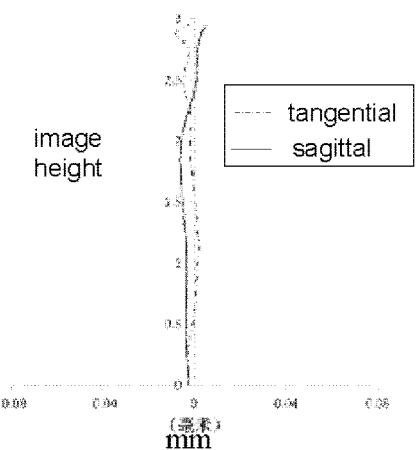
Figure 4C:
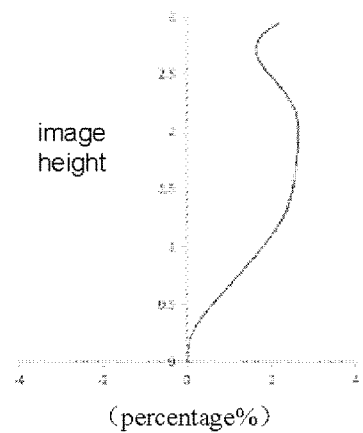
Figure 4D:
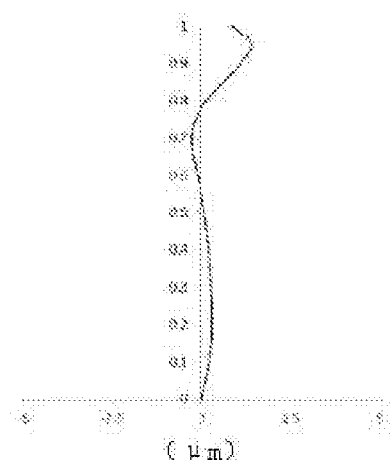

FIG. 4A illustrates a longitudinal aberration curve of the optical imaging lens assembly according to embodiment 2 to represent deviation of a convergence focal point after light with different wavelengths passes through the lens. FIG. 4B illustrates an astigmatism curve of the optical imaging lens assembly according to embodiment 2 to represent a tangential image surface curvature and a sagittal image surface curvature. FIG. 4C illustrates a distortion curve of the optical imaging lens assembly according to embodiment 2 to represent a distortion value under different viewing angles. FIG. 4D illustrates a lateral color curve of the optical imaging lens assembly according to embodiment 2 to represent deviation of different image heights on the imaging surface after the light passes through the lens. According to FIG. 4A to FIG. 4D, it can be seen that the optical imaging lens assembly provided in embodiment 2 can achieve high imaging quality.

Embodiment 3

Figure 5:
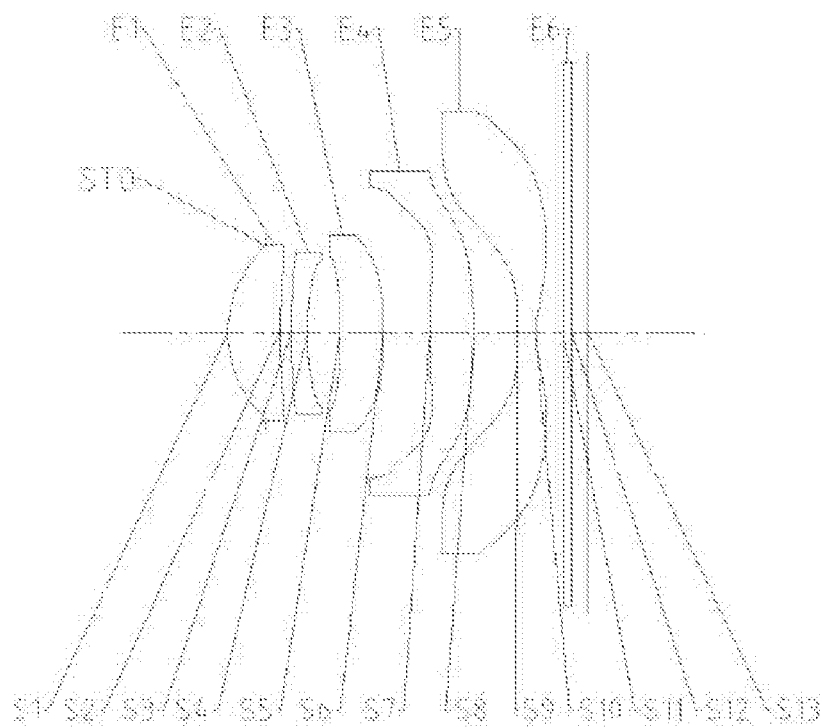
FIG. 5 is a schematic structure diagram of an optical imaging lens assembly according to embodiment 3 of the application.

An optical imaging lens assembly according to embodiment 3 of the application will be described below with reference to FIG. 5 to FIG. 6D. In the embodiment and the following embodiments, part of descriptions similar to the embodiment 1 are omitted for simplicity. FIG. 5 is a schematic structure diagram of an optical imaging lens assembly according to embodiment 3 of the application.

As shown in FIG. 5, the optical imaging lens assembly according to an exemplary implementation of the application includes a diaphragm STO, a first lens E1, a second lens E2, a third lens E3, a fourth lens E4, a fifth lens E5, an optical filter E6 and an imaging surface S13 which are provided in sequence from an object side to an image side along an optical axis.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a concave surface, and an image-side surface S6 is a convex surface. The fourth lens E4 has a positive refractive power, an object-side surface S7 thereof is a convex surface, and an image-side surface S8 is a convex surface. The fifth lens E5 has a negative refractive power, an object-side surface S9 thereof is a convex surface, and an image-side surface S10 is a concave surface. The optical filter E6 has an object-side surface S11 and an image-side surface S12. Light from an object sequentially penetrates through each of the surfaces S1 to S12 and is finally image on the imaging surface S13.

Table 5 shows the surface type, the radius of curvature, the thickness, the material and the conic coefficient of each lens of the optical imaging lens assembly according to embodiment 3. Units of the radius of curvature and the thickness are millimeter (mm).

TABLE 5

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −0.4494 | | | |
| S1 | Aspherical | 1.4171 | 0.6222 | 1.50 | 81.6 | −0.1318 |
| S2 | Aspherical | 6.1293 | 0.1352 | | | 32.3832 |
| S3 | Aspherical | 6.4985 | 0.2000 | 1.82 | 24.1 | 36.1029 |
| S4 | Aspherical | 3.6556 | 0.3879 | | | 9.2164 |
| S5 | Aspherical | −16.6572 | 0.5265 | 1.54 | 56.1 | 72.2586 |
| S6 | Aspherical | −5.4332 | 0.5539 | | | 14.1959 |
| S7 | Aspherical | 7.0915 | 0.5315 | 1.54 | 56.1 | −0.0162 |
| S8 | Aspherical | −4.5110 | 0.5214 | | | 0.5055 |
| S9 | Aspherical | 9.5622 | 0.2240 | 1.54 | 55.7 | −64.7681 |
| S10 | Aspherical | 1.1582 | 0.3309 | | | −7.5811 |
| S11 | Spherical | Infinite | 0.1100 | 1.52 | 64.2 | |
| S12 | Spherical | Infinite | 0.1964 | | | |
| S13 | Spherical | Infinite | | | | |

Table 6 shows higher-order coefficients applied to each aspherical mirror surface in embodiment 3. The surface type of each aspherical surface may be defined by formula (1) given in embodiment 1.

TABLE 6

| Surface number | A4 | A6 | A8 | A10 | A12 | A14 | A16 | A18 | A20 |
|---|---|---|---|---|---|---|---|---|---|
| S1 | 9.3956E−03 | −2.1713E−02 | 1.6294E−01 | −5.3067E−01 | 9.9467E−01 | −1.0745E+00 | 6.2388E−01 | −1.5448E−01 | 0.0000E+00 |
| S2 | −8.2152E−02 | 5.6017E−02 | −2.5359E−01 | 1.3734E+00 | −4.3951E+00 | 8.0459E+00 | −8.5461E+00 | 4.8922E+00 | −1.1743E+00 |
| S3 | −1.2609E−01 | 1.5993E−01 | −1.6434E−01 | 4.3389E−01 | −9.1075E−01 | 9.9971E−01 | −5.2790E−01 | 1.0072E−01 | 0.0000E+00 |
| S4 | −7.5380E−02 | 1.2666E−01 | 1.4704E−01 | −8.0541E−01 | 2.0923E+00 | −3.0254E+00 | 2.3177E+00 | −6.7079E−01 | 0.0000E+00 |
| S5 | −1.0523E−01 | 5.6225E−02 | −5.4061E−01 | 2.4334E+00 | −6.5876E+00 | 1.0788E+01 | −1.0458E+01 | 5.4711E+00 | −1.1521E+00 |
| S6 | −8.4062E−02 | −3.8481E−02 | 1.6426E−01 | −5.3880E−01 | 1.0972E+00 | −1.3694E+00 | 1.0259E+00 | −4.2502E−01 | 7.5865E−02 |
| S7 | 2.1676E−03 | −6.6311E−02 | 7.4681E−03 | 7.4559E−02 | −1.5243E−01 | 1.3892E−01 | −6.7316E−02 | 1.6785E−02 | −1.6798E−03 |
| S8 | 8.5498E−02 | −1.2073E−01 | 1.0583E−01 | −8.8869E−02 | 4.4728E−02 | −1.1189E−02 | 1.1085E−03 | 2.4434E−05 | −8.3304E−06 |
| S9 | −6.1121E−01 | 6.3352E−01 | −5.1261E−01 | 2.8725E−01 | −1.0163E−01 | 2.2356E−02 | −2.9799E−03 | 2.2105E−04 | −7.0202E−06 |
| S10 | −2.3842E−01 | 2.1873E−01 | −1.4246E−01 | 6.1892E−02 | −1.7470E−02 | 3.1531E−03 | −3.5247E−04 | 2.2359E−05 | −6.1847E−07 |

Figure 6A:
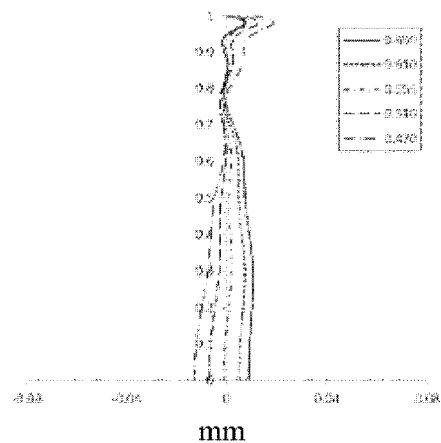
FIG. 6A to FIG. 6D illustrate a longitudinal aberration curve, an astigmatism curve, a distortion curve and a lateral color curve of an optical imaging lens assembly respectively according to embodiment 3.
Figure 6B:
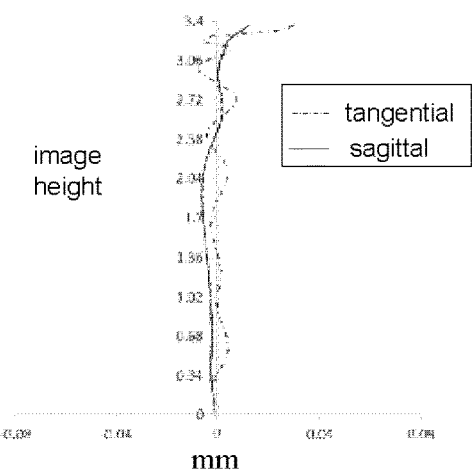
Figure 6C:
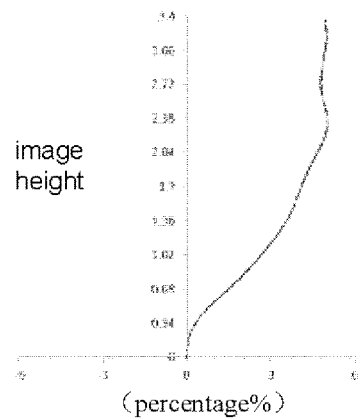
Figure 6D:
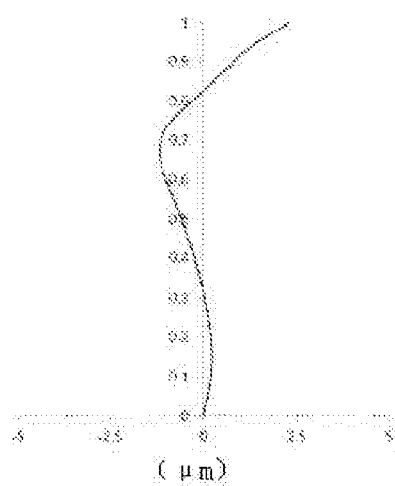

FIG. 6A illustrates a longitudinal aberration curve of the optical imaging lens assembly according to embodiment 3 to represent deviation of a convergence focal point after light with different wavelengths passes through the lens. FIG. 6B illustrates an astigmatism curve of the optical imaging lens assembly according to embodiment 3 to represent a tangential image surface curvature and a sagittal image surface curvature. FIG. 6C illustrates a distortion curve of the optical imaging lens assembly according to embodiment 3 to represent a distortion value under different viewing angles. FIG. 6D illustrates a lateral color curve of the optical imaging lens assembly according to embodiment 3 to represent deviation of different image heights on the imaging surface after the light passes through the lens. According to FIG. 6A to FIG. 6D, it can be seen that the optical imaging lens assembly provided in embodiment 3 can achieve high imaging quality.

Embodiment 4

Figure 7:
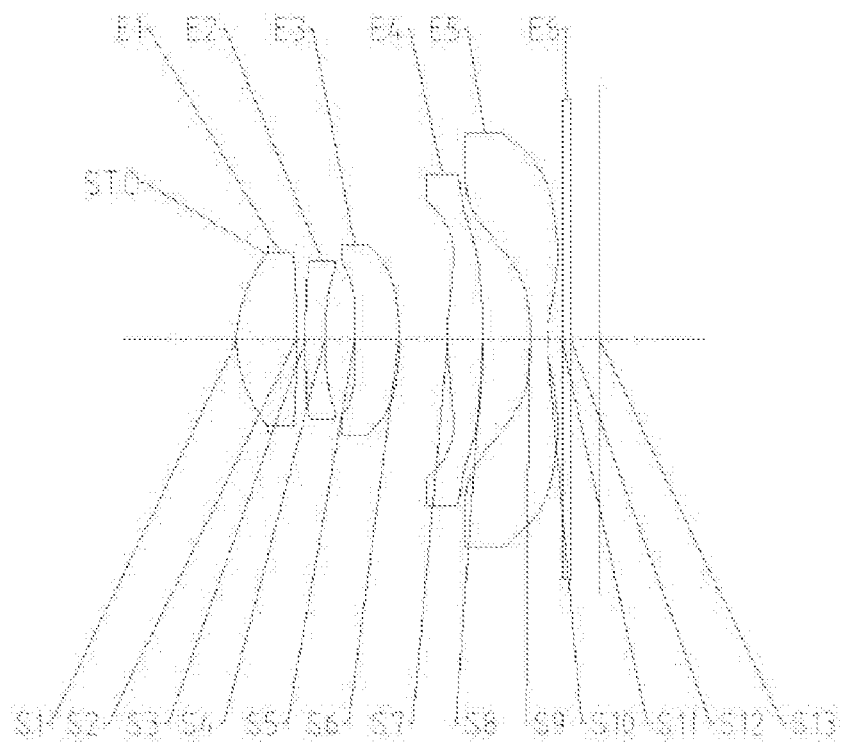
FIG. 7 is a schematic structure diagram of an optical imaging lens assembly according to embodiment 4 of the application.

An optical imaging lens assembly according to embodiment 4 of the application will be described below with reference to FIG. 7 to FIG. 8D. In the embodiment and the following embodiments, part of descriptions similar to the embodiment 1 are omitted for simplicity. FIG. 7 is a schematic structure diagram of an optical imaging lens assembly according to embodiment 4 of the application.

As shown in FIG. 7, the optical imaging lens assembly according to an exemplary implementation of the application includes a diaphragm STO, a first lens E1, a second lens E2, a third lens E3, a fourth lens E4, a fifth lens E5, an optical filter E6 and an imaging surface S13 which are provided in sequence from an object side to an image side along an optical axis.

The first lens E1 has a positive refractive power, an object-side surface S1 thereof is a convex surface, and an image-side surface S2 is a convex surface. The second lens E2 has a negative refractive power, an object-side surface S3 thereof is a convex surface, and an image-side surface S4 is a concave surface. The third lens E3 has a positive refractive power, an object-side surface S5 thereof is a concave surface, and an image-side surface S6 is a convex surface. The fourth lens E4 has a positive refractive power, an object-side surface S7 thereof is a convex surface, and an image-side surface S8 is a convex surface. The fifth lens E5 has a negative refractive power, an object-side surface S9 thereof is a convex surface, and an image-side surface S10 is a concave surface. The optical filter E6 has an object-side surface S11 and an image-side surface S12. Light from an object sequentially penetrates through each of the surfaces S1 to S12 and is finally image on the imaging surface S13.

Table 7 shows the surface type, the radius of curvature, the thickness, the material and the conic coefficient of each lens of the optical imaging lens assembly according to embodiment 4. Units of the radius of curvature and the thickness are millimeter (mm).

TABLE 7

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −0.3322 | | | |
| S1 | Aspherical | 1.5117 | 0.7020 | 1.50 | 81.6 | −0.3364 |
| S2 | Aspherical | −900.0000 | 0.1115 | | | −50.0000 |
| S3 | Aspherical | 12.0000 | 0.2267 | 1.82 | 24.1 | 88.7065 |
| S4 | Aspherical | 3.3134 | 0.3609 | | | 7.4340 |
| S5 | Aspherical | −22.4983 | 0.5160 | 1.54 | 56.1 | 99.0000 |
| S6 | Aspherical | −5.0766 | 0.5799 | | | 15.5461 |
| S7 | Aspherical | 4.9944 | 0.4202 | 1.54 | 56.1 | −2.3274 |
| S8 | Aspherical | −4.4164 | 0.5453 | | | −7.8765 |
| S9 | Aspherical | 12.1632 | 0.2100 | 1.54 | 55.7 | 10.4606 |
| S10 | Aspherical | 1.0840 | 0.1809 | | | −7.3311 |
| S11 | Spherical | Infinite | 0.1100 | 1.52 | 64.2 | |
| S12 | Spherical | Infinite | 0.3368 | | | |
| S13 | Spherical | Infinite | | | | |

Table 8 shows higher-order coefficients applied to each aspherical mirror surface in embodiment 4. The surface type of each aspherical surface may be defined by formula (1) given in embodiment 1.

TABLE 8

| Surface number | A4 | A6 | A8 | A10 | A12 | A14 | A16 | A18 | A20 |
|---|---|---|---|---|---|---|---|---|---|
| S1 | 1.0637E−02 | −4.2814E−02 | 2.3724E−01 | −7.5915E−01 | 1.3799E+00 | −1.4556E+00 | 8.1092E−01 | −1.8815E−01 | 0.0000E+00 |
| S2 | −4.8075E−02 | 6.0593E−02 | 1.7828E−01 | −1.3868E+00 | 3.9344E+00 | −6.4426E+00 | 6.1558E+00 | −3.1556E+00 | 6.6565E−01 |
| S3 | −9.0386E−02 | 2.4970E−01 | −3.6752E−01 | 4.9909E−01 | −6.2238E−01 | 5.2885E−01 | −1.5611E−01 | −2.1731E−02 | 0.0000E+00 |
| S4 | −8.7959E−02 | 2.3027E−01 | −3.7443E−01 | 6.5220E−01 | −1.2626E+00 | 2.2078E+00 | −2.3993E+00 | 1.1820E+00 | 0.0000E+00 |
| S5 | −1.3618E−01 | −3.5058E−01 | 2.8722E+00 | −1.5140E+01 | 4.8566E+01 | −9.7892E+01 | 1.2050E+02 | −8.3071E+01 | 2.4707E+01 |
| S6 | −1.1109E−01 | −1.1817E−01 | 5.5070E−01 | −1.8147E+00 | 3.7792E+00 | −5.0151E+00 | 4.1046E+00 | −1.8958E+00 | 3.8178E−01 |
| S7 | 3.3714E−02 | −1.6281E−01 | 3.0202E−01 | −4.2956E−01 | 3.7638E−01 | −2.0856E−01 | 7.1833E−02 | −1.3952E−02 | 1.1600E−03 |
| S8 | 1.0015E−01 | −1.7769E−01 | 2.6068E−01 | −2.8519E−01 | 1.8287E−01 | −6.7294E−02 | 1.4154E−02 | −1.5900E−03 | 7.4239E−05 |
| S9 | −7.8158E−01 | 9.1008E−01 | −7.3341E−01 | 4.0117E−01 | −1.4027E−01 | 3.0711E−02 | −4.0776E−03 | 3.0064E−04 | −9.4571E−06 |
| S10 | −3.2452E−01 | 3.5933E−01 | −2.6354E−01 | 1.2859E−01 | −4.1454E−02 | 8.6684E−03 | −1.1296E−03 | 8.3241E−05 | −2.6424E−06 |

Figure 8A:
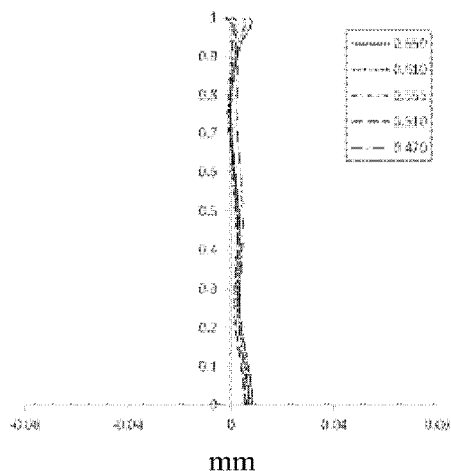
FIG. 8A to FIG. 8D illustrate a longitudinal aberration curve, an astigmatism curve, a distortion curve and a lateral color curve of an optical imaging lens assembly respectively according to embodiment 4.
Figure 8B:
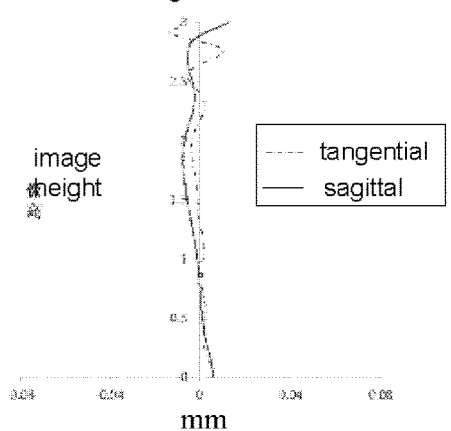
Figure 8C:
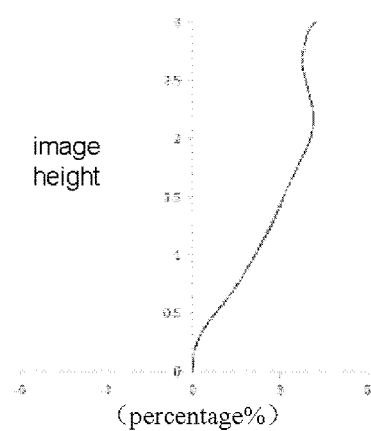
Figure 8D:
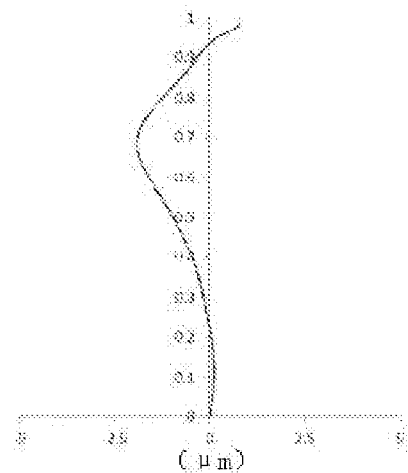

FIG. 8A illustrates a longitudinal aberration curve of the optical imaging lens assembly according to embodiment 4 to represent deviation of a convergence focal point after light with different wavelengths passes through the lens. FIG. 8B illustrates an astigmatism curve of the optical imaging lens assembly according to embodiment 4 to represent a tangential image surface curvature and a sagittal image surface curvature. FIG. 8C illustrates a distortion curve of the optical imaging lens assembly according to embodiment 4 to represent a distortion value under different viewing angles. FIG. 8D illustrates a lateral color curve of the optical imaging lens assembly according to embodiment 4 to represent deviation of different image heights on the imaging surface after the light passes through the lens. According to FIG. 8A to FIG. 8D, it can be seen that the optical imaging lens assembly provided in embodiment 4 can achieve high imaging quality.

Embodiment 5

Figure 9:
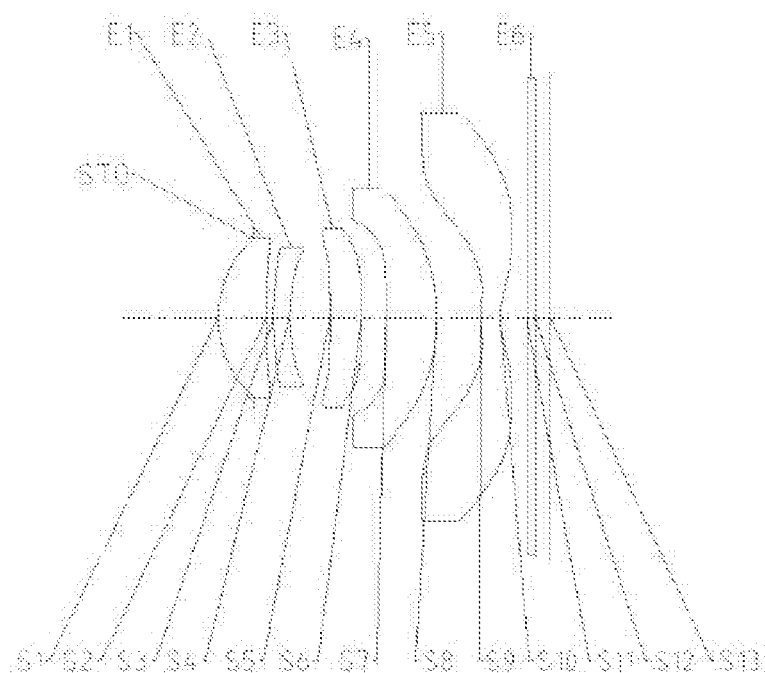
FIG. 9 is a schematic structure diagram of an optical imaging lens assembly according to embodiment 5 of the application.

An optical imaging lens assembly according to embodiment 5 of the application will be described below with reference to FIG. 9 to FIG. 10D. In the embodiment and the following embodiments, part of descriptions similar to the embodiment 1 are omitted for simplicity. FIG. 9 is a schematic structure diagram of an optical imaging lens assembly according to embodiment 5 of the application.

As shown in FIG. 9, the optical imaging lens assembly according to an exemplary implementation of the application includes a diaphragm STO, a first lens E1, a second lens E2, a third lens E3, a fourth lens E4, a fifth lens E5, an optical filter E6 and an imaging surface S13 which are provided in sequence from an object side to an image side along an optical axis.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a convex surface. The fourth lens E4 has a positive refractive power, an object-side surface S7 thereof is a concave surface, and an image-side surface S8 is a convex surface. The fifth lens E5 has a negative refractive power, an object-side surface S9 thereof is a convex surface, and an image-side surface S10 is a concave surface. The optical filter E6 has an object-side surface S11 and an image-side surface S12. Light from an object sequentially penetrates through each of the surfaces S1 to S12 and is finally image on the imaging surface S13.

Table 9 shows the surface type, the radius of curvature, the thickness, the material and the conic coefficient of each lens of the optical imaging lens assembly according to embodiment 5. Units of the radius of curvature and the thickness are millimeter (mm).

TABLE 9

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −0.4560 | | | |
| S1 | Aspherical | 1.4023 | 0.6271 | 1.50 | 81.6 | −0.0975 |
| S2 | Aspherical | 6.3124 | 0.1000 | | | 35.2522 |
| S3 | Aspherical | 3.8415 | 0.2100 | 1.82 | 24.1 | 11.6757 |
| S4 | Aspherical | 2.6163 | 0.5253 | | | 5.8216 |
| S5 | Aspherical | 300.0000 | 0.4116 | 1.54 | 56.1 | 99.0000 |
| S6 | Aspherical | −20.8435 | 0.3227 | | | −42.6904 |
| S7 | Aspherical | −500.0000 | 0.6591 | 1.54 | 56.1 | −99.0000 |
| S8 | Aspherical | −2.6740 | 0.5824 | | | −0.2024 |
| S9 | Aspherical | 2.8958 | 0.2488 | 1.54 | 55.7 | −99.0000 |
| S10 | Aspherical | 0.9117 | 0.3500 | | | −7.9098 |
| S11 | Spherical | Infinite | 0.1100 | 1.52 | 64.2 | |
| S12 | Spherical | Infinite | 0.2031 | | | |
| S13 | Spherical | Infinite | | | | |

Table 10 shows higher-order coefficients applied to each aspherical mirror surface in embodiment 5. The surface type of each aspherical surface may be defined by formula (1) given in embodiment 1.

TABLE 10

| Surface number | A4 | A6 | A8 | A10 | A12 | A14 | A16 | A18 | A20 |
|---|---|---|---|---|---|---|---|---|---|
| S1 | 1.0856E−02 | −4.7946E−02 | 2.9605E−01 | −9.5411E−01 | 1.8704E+00 | −2.2318E+00 | 1.5624E+00 | −5.7616E−01 | 8.1099E−02 |
| S2 | −1.1870E−01 | 1.7217E−01 | −5.1052E−01 | 1.8672E+00 | −5.0388E+00 | 8.4890E+00 | −8.5982E+00 | 4.7919E+00 | −1.1369E+00 |
| S3 | −1.5864E−01 | 1.5628E−01 | −2.5033E−01 | −2.0000E−01 | 3.1486E−01 | −2.2815E−01 | 6.2680E−02 | 0.0000E+00 | 0.0000E+00 |
| S4 | −9.3363E−02 | 1.0551E−01 | 9.4816E−02 | −5.0680E−01 | 9.6483E−01 | −9.1174E−01 | 3.6772E−01 | 0.0000E+00 | 0.0000E+00 |
| S5 | −8.8254E−02 | −7.3462E−03 | 3.6467E−03 | 1.7123E−01 | −7.6024E−01 | 1.5733E+00 | −1.7874E+00 | 1.0692E+00 | −2.5541E−01 |
| S6 | −1.0497E−01 | −6.8536E−02 | 2.7119E−01 | −8.5913E−01 | 1.6639E+00 | −2.0001E+00 | 1.4677E+00 | −6.0886E−01 | 1.1102E−01 |
| S7 | −4.6358E−02 | −9.6150E−02 | 1.8075E−01 | −4.4989E−01 | 6.9533E−01 | −7.1152E−01 | 4.6168E−01 | −1.6915E−01 | 2.6066E−02 |
| S8 | −1.1993E−02 | 5.6412E−02 | −1.6929E−01 | 2.3883E−01 | −2.2074E−01 | 1.2991E−01 | −4.4938E−02 | 8.2636E−03 | −6.2381E−04 |
| S9 | −6.1827E−01 | 6.5034E−01 | −4.8233E−01 | 2.4548E−01 | −8.0757E−02 | 1.6839E−02 | −2.1550E−03 | 1.5483E−04 | −4.7908E−06 |
| S10 | −2.2784E−01 | 1.9821E−01 | −1.1488E−01 | 4.3579E−02 | −1.0776E−02 | 1.6890E−03 | −1.5877E−04 | 7.9945E−06 | −1.6059E−07 |

Figure 10A:
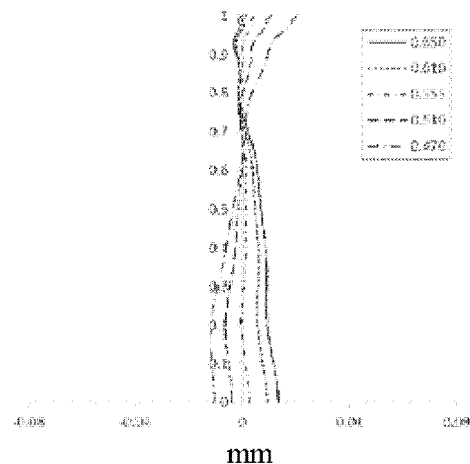
FIG. 10A to FIG. 10D illustrate a longitudinal aberration curve, an astigmatism curve, a distortion curve and a lateral color curve of an optical imaging lens assembly respectively according to embodiment 5.
Figure 10B:
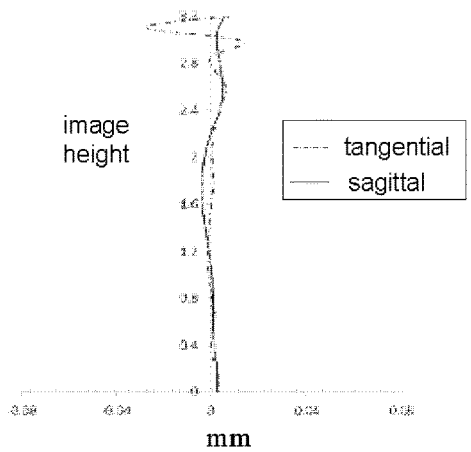
Figure 10C:
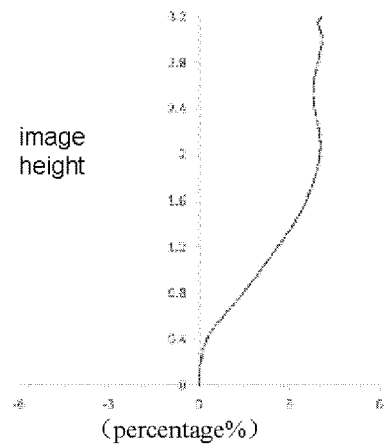
Figure 10D:
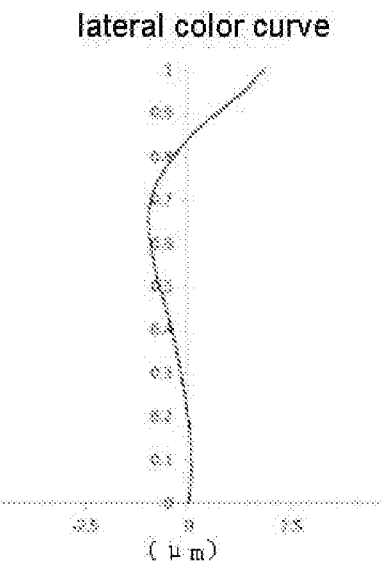

FIG. 10A illustrates a longitudinal aberration curve of the optical imaging lens assembly according to embodiment 5 to represent deviation of a convergence focal point after light with different wavelengths passes through the lens. FIG. 10B illustrates an astigmatism curve of the optical imaging lens assembly according to embodiment 5 to represent a tangential image surface curvature and a sagittal image surface curvature. FIG. 10C illustrates a distortion curve of the optical imaging lens assembly according to embodiment 5 to represent a distortion value under different viewing angles. FIG. 10D illustrates a lateral color curve of the optical imaging lens assembly according to embodiment 5 to represent deviation of different image heights on the imaging surface after the light passes through the lens. According to FIG. 10A to FIG. 10D, it can be seen that the optical imaging lens assembly provided in embodiment 5 can achieve high imaging quality.

Embodiment 6

Figure 11:
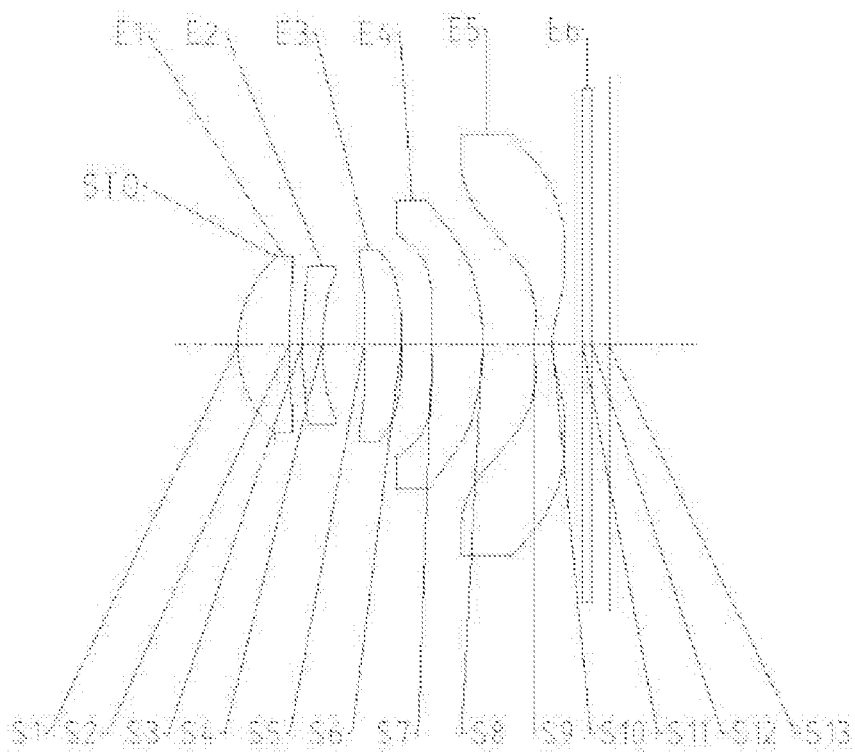
FIG. 11 is a schematic structure diagram of an optical imaging lens assembly according to embodiment 6 of the application.

An optical imaging lens assembly according to embodiment 6 of the application will be described below with reference to FIG. 11 to FIG. 12D. In the embodiment and the following embodiments, part of descriptions similar to the embodiment 1 are omitted for simplicity. FIG. 11 is a schematic structure diagram of an optical imaging lens assembly according to embodiment 6 of the application.

As shown in FIG. 11, the optical imaging lens assembly according to an exemplary implementation of the application includes a diaphragm STO, a first lens E1, a second lens E2, a third lens E3, a fourth lens E4, a fifth lens E5, an optical filter E6 and an imaging surface S13 which are provided in sequence from an object side to an image side along an optical axis.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a convex surface. The fourth lens E4 has a positive refractive power, an object-side surface S7 thereof is a concave surface, and an image-side surface S8 is a convex surface. The fifth lens E5 has a negative refractive power, an object-side surface S9 thereof is a convex surface, and an image-side surface S10 is a concave surface. The optical filter E6 has an object-side surface S11 and an image-side surface S12. Light from an object sequentially penetrates through each of the surfaces S1 to S12 and is finally image on the imaging surface S13.

Table 11 shows the surface type, the radius of curvature, the thickness, the material and the conic coefficient of each lens of the optical imaging lens assembly according to embodiment 6. Units of the radius of curvature and the thickness are millimeter (mm).

TABLE 11

| Surface number | Surface type | Radius of curvature | Thickness | Material | | Conic coefficient |
|---|---|---|---|---|---|---|
| | | | | Refractive index | Abbe number | |
| OBJ | Spherical | Infinite | Infinite | | | |
| STO | Spherical | Infinite | −0.4282 | | | |
| S1 | Aspherical | 1.4074 | 0.5949 | 1.50 | 81.6 | −0.1132 |
| S2 | Aspherical | 6.1375 | 0.1503 | | | 34.1156 |
| S3 | Aspherical | 4.1756 | 0.2347 | 1.82 | 24.1 | 15.3431 |
| S4 | Aspherical | 2.6565 | 0.4850 | | | 6.0502 |
| S5 | Aspherical | 39.1339 | 0.4314 | 1.54 | 56.1 | 99.0000 |
| S6 | Aspherical | −10.0940 | 0.3575 | | | 7.3787 |
| S7 | Aspherical | −500.0000 | 0.5833 | 1.54 | 56.1 | 99.0000 |
| S8 | Aspherical | −2.9559 | 0.6000 | | | 0.4674 |
| S9 | Aspherical | 2.9292 | 0.2105 | 1.54 | 55.7 | −99.0000 |
| S10 | Aspherical | 0.9160 | 0.3500 | | | −7.7951 |
| S11 | Spherical | Infinite | 0.1100 | 1.52 | 64.2 | |
| S12 | Spherical | Infinite | 0.1923 | | | |
| S13 | Spherical | Infinite | | | | |

Table 12 shows higher-order coefficients applied to each aspherical mirror surface in embodiment 6. The surface type of each aspherical surface may be defined by formula (1) given in embodiment 1.

TABLE 12

| Surface number | A4 | A6 | A8 | A10 | A12 | A14 | A16 | A18 | A20 |
|---|---|---|---|---|---|---|---|---|---|
| S1 | 1.1747E−02 | −7.4686E−02 | 4.6405E−01 | −1.6118E+00 | 3.4411E+00 | −4.5444E+00 | 3.6050E+00 | −1.5668E+00 | 2.8337E−01 |
| S2 | −8.7160E−02 | 9.6476E−02 | −4.8914E−01 | 2.1932E+00 | −6.2068E+00 | 1.0713E+01 | −1.1116E+01 | 6.3637E+00 | −1.5529E+00 |
| S3 | −1.3396E−01 | 8.7552E−02 | −4.6967E−02 | 1.7289E−01 | −4.5908E−01 | 4.7113E−01 | −1.8647E−01 | 0.0000E+00 | 0.0000E+00 |
| S4 | −8.8801E−02 | 1.1916E−01 | −1.9974E−01 | 6.4923E−01 | −1.1795E+00 | 1.0472E+00 | −3.5318E−01 | 0.0000E+00 | 0.0000E+00 |
| S5 | −7.6738E−02 | 5.6517E−03 | −1.9250E−01 | 1.1296E+00 | −3.3828E+00 | 5.8143E+00 | −5.8111E+00 | 3.1299E+00 | −6.9351E−01 |
| S6 | −8.9870E−02 | −1.4613E−01 | 6.3587E−01 | −2.0810E+00 | 4.2641E+00 | −5.4570E+00 | 4.2357E+00 | −1.8294E+00 | 3.3827E−01 |
| S7 | −3.4232E−02 | −1.0417E−01 | 6.4808E−02 | 1.9029E−01 | −2.4400E+00 | 3.8042E−01 | −2.7971E−01 | 1.0420E−01 | −1.6097E−02 |
| S8 | 2.3513E−02 | −1.3681E−02 | −6.8956E−02 | 1.2219E−01 | −1.3246E−01 | 8.9343E−02 | −3.4024E−02 | 6.7004E−03 | −5.3445E−04 |
| S9 | −6.6296E−01 | 7.3862E−01 | −5.8562E−01 | 3.1207E−01 | −1.0593E−01 | 2.2593E−02 | −2.9376E−03 | 2.1294E−04 | −6.6003E−06 |
| S10 | −2.6538E−01 | 2.6068E−01 | −1.7347E−01 | 7.6601E−02 | −2.2489E−02 | 4.3176E−03 | −5.2048E−04 | 3.5798E−05 | −1.0726E−06 |

Figure 12A:
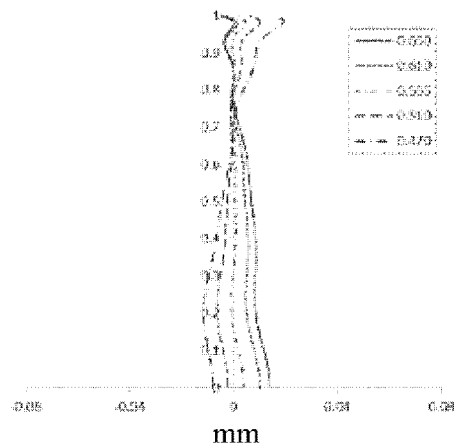
FIG. 12A to FIG. 12D illustrate a longitudinal aberration curve, an astigmatism curve, a distortion curve and a lateral color curve of an optical imaging lens assembly respectively according to embodiment 6.
Figure 12B:
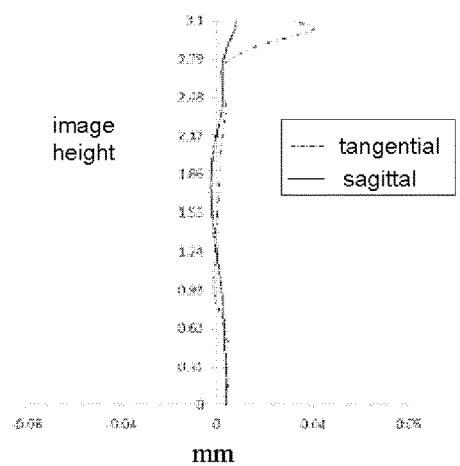
Figure 12C:
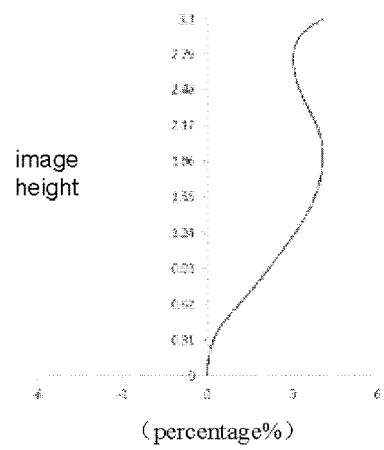
Figure 12D:
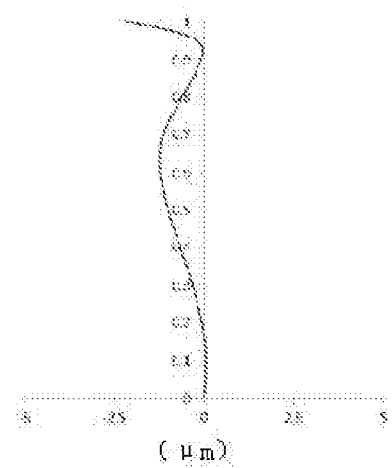

FIG. 12A illustrates a longitudinal aberration curve of the optical imaging lens assembly according to embodiment 6 to represent deviation of a convergence focal point after light with different wavelengths passes through the lens. FIG. 12B illustrates an astigmatism curve of the optical imaging lens assembly according to embodiment 6 to represent a tangential image surface curvature and a sagittal image surface curvature. FIG. 12C illustrates a distortion curve of the optical imaging lens assembly according to embodiment 6 to represent a distortion value under different viewing angles. FIG. 12D illustrates a lateral color curve of the optical imaging lens assembly according to embodiment 6 to represent deviation of different image heights on the imaging surface after the light passes through the lens. According to FIG. 12A to FIG. 12D, it can be seen that the optical imaging lens assembly provided in embodiment 6 can achieve high imaging quality.

Embodiment 7

Figure 13:
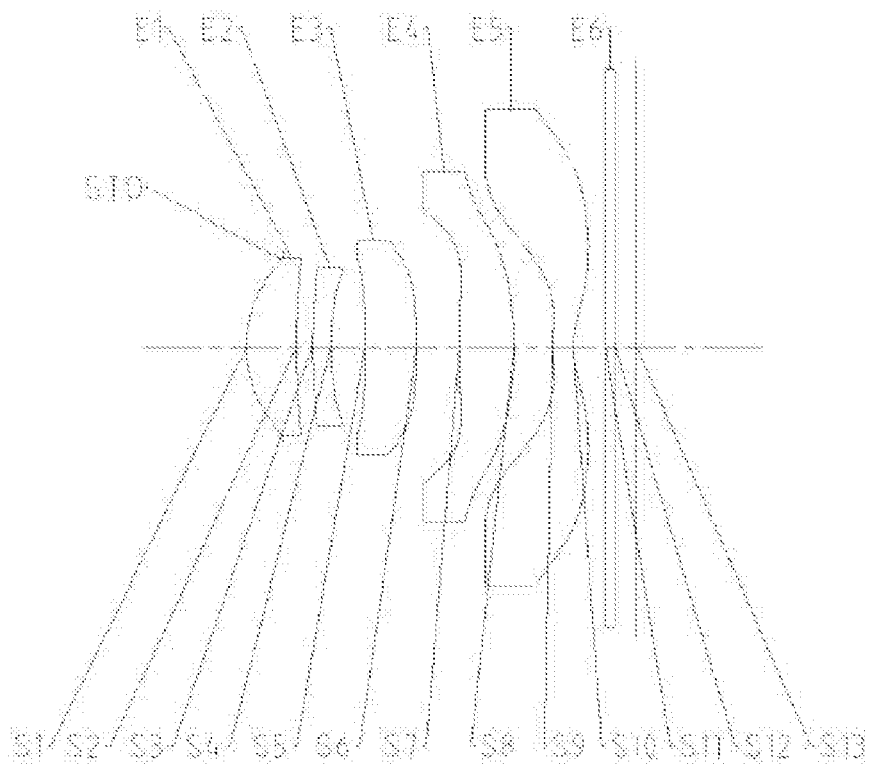
FIG. 13 is a schematic structure diagram of an optical imaging lens assembly according to embodiment 7 of the application.

An optical imaging lens assembly according to embodiment 7 of the application will be described below with reference to FIG. 13 to FIG. 14D. In the embodiment and the following embodiments, part of descriptions similar to the embodiment 1 are omitted for simplicity. FIG. 13 is a schematic structure diagram of an optical imaging lens assembly according to embodiment 7 of the application.

As shown in FIG. 13, the optical imaging lens assembly according to an exemplary implementation of the application includes a diaphragm STO, a first lens E1, a second lens E2, a third lens E3, a fourth lens E4, a fifth lens E5, an optical filter E6 and an imaging surface S13 which are provided in sequence from an object side to an image side along an optical axis.

The first lens E1 has a positive refractive power, an object-side surface S1 thereof is a convex surface, and an image-side surface S2 is a concave surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a convex surface. The fourth lens E4 has a positive refractive power, an object-side surface S7 thereof is a convex surface, and an image-side surface S8 is a convex surface. The fifth lens E5 has a negative refractive power, an object-side surface S9 thereof is a convex surface, and an image-side surface S10 is a concave surface. The optical filter E6 has an object-side surface S11 and an image-side surface S12. Light from an object sequentially penetrates through each of the surfaces S1 to S12 and is finally image on the imaging surface S13.

Table 13 shows the surface type, the radius of curvature, the thickness, the material and the conic coefficient of each lens of the optical imaging lens assembly according to embodiment 7. Units of the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.3912 | | | |
| S1 | Aspherical | 1.4443 | 0.5653 | 1.50 | 81.6 | −0.0995 |
| S2 | Aspherical | 6.4718 | 0.1852 | | | 39.9228 |
| S3 | Aspherical | 5.1691 | 0.2100 | 1.82 | 24.1 | 26.1725 |
| S4 | Aspherical | 3.0193 | 0.3867 | | | 6.5111 |
| S5 | Aspherical | 150.0000 | 0.5931 | 1.54 | 56.1 | −99.0000 |
| S6 | Aspherical | −8.0397 | 0.4811 | | | 26.3236 |
| S7 | Aspherical | 8.1429 | 0.6271 | 1.54 | 56.1 | −7.1667 |
| S8 | Aspherical | −3.5814 | 0.4381 | | | 0.0041 |
| S9 | Aspherical | 2.9821 | 0.2400 | 1.54 | 55.7 | −99.0000 |
| S10 | Aspherical | 0.8923 | 0.3688 | | | −6.9338 |
| S11 | Spherical | Infinite | 0.1122 | 1.52 | 64.2 | |
| S12 | Spherical | Infinite | 0.2423 | | | |
| S13 | Spherical | Infinite | | | | |

Table 14 shows higher-order coefficients applied to each aspherical mirror surface in embodiment 7. The surface type of each aspherical surface may be defined by formula (1) given in embodiment 1.

TABLE 14

| Surface number | A4 | A6 | A8 | A10 | A12 | A14 | A16 | A18 | A20 |
|---|---|---|---|---|---|---|---|---|---|
| S1 | 1.1517E−02 | −7.1700E−02 | 5.3600E−01 | −2.1149E+00 | 5.0415E+00 | −7.3530E+00 | 6.4115E+00 | −3.0634E+00 | 6.1481E−01 |
| S2 | −5.4133E−02 | −6.1344E−02 | 5.0119E−01 | −1.6703E+00 | 2.8425E+00 | −2.1491E+00 | −3.4692E−01 | 1.5555E+00 | −6.9625E−01 |
| S3 | −1.2584E−01 | 1.1069E−01 | −1.1515E−01 | 3.3286E−01 | −7.7488E−01 | 8.3624E−01 | −3.5911E−01 | 0.0000E+00 | 0.0000E+00 |
| S4 | −9.4627E−02 | 1.6086E−01 | −2.7742E−01 | 8.0538E−01 | −1.4153E+00 | 1.2834E+00 | −4.4002E−01 | 0.0000E+00 | 0.0000E+00 |
| S5 | −8.0380E−02 | −4.1891E−02 | 2.6874E−01 | −9.8263E−01 | 2.0921E+00 | −2.7678E+00 | 2.2300E+00 | −1.0117E+00 | 2.0946E−01 |
| S6 | −7.7881E−02 | −6.3987E−02 | 2.2707E−01 | −5.7262E−01 | 9.2790E−01 | −9.6960E−01 | 6.2939E−01 | −2.3103E−01 | 3.6912E−02 |
| S7 | −4.6252E−03 | −9.2852E−02 | 9.0449E−02 | −6.5607E−02 | 4.0098E−03 | 2.9192E−02 | −2.2509E−02 | 7.2355E−03 | −8.6663E−04 |
| S8 | 5.1992E−02 | −8.1906E−02 | 5.7156E−02 | −2.6509E−02 | 3.2497E−03 | 3.4838E−03 | −1.7414E−03 | 3.1173E−04 | −2.0035E−05 |
| S9 | −5.7241E−01 | 4.5945E−01 | −2.4903E−01 | 1.0192E−01 | −2.9030E−02 | 5.4033E−03 | −6.2294E−04 | 4.0367E−05 | −1.1255E−06 |
| S10 | −2.2486E−01 | 1.7027E−01 | −8.5290E−02 | 2.9213E−02 | −6.7540E−03 | 1.0159E−03 | −9.4529E−05 | 4.9498E−06 | −1.1229E−07 |

Figure 14A:
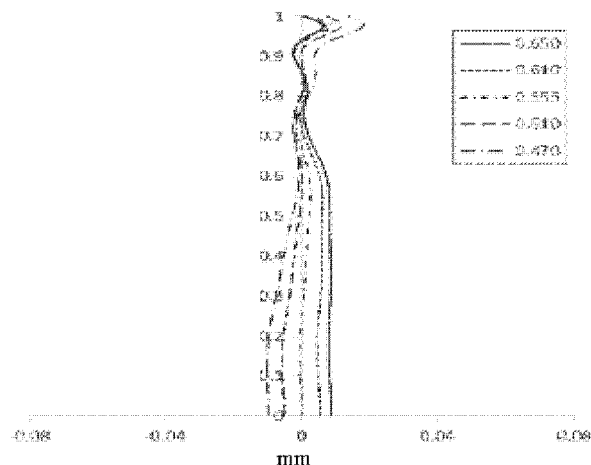
FIG. 14A to FIG. 14D illustrate a longitudinal aberration curve, an astigmatism curve, a distortion curve and a lateral color curve of an optical imaging lens assembly respectively according to embodiment 7.
Figure 14B:
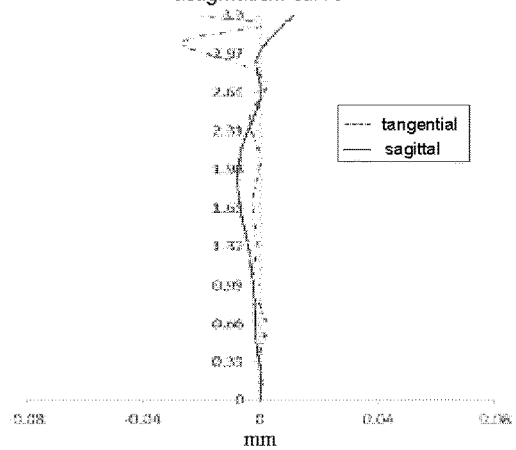
Figure 14C:
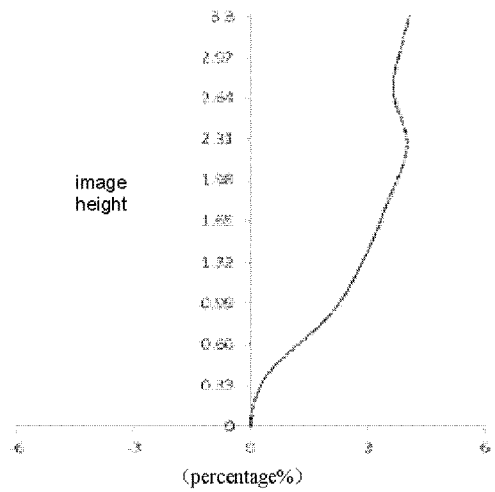
Figure 14D:
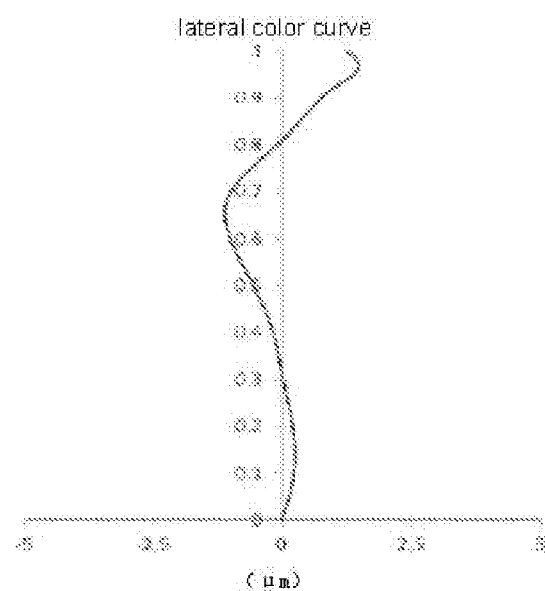

FIG. 14A illustrates a longitudinal aberration curve of the optical imaging lens assembly according to embodiment 7 to represent deviation of a convergence focal point after light with different wavelengths passes through the lens. FIG. 14B illustrates an astigmatism curve of the optical imaging lens assembly according to embodiment 7 to represent a tangential image surface curvature and a sagittal image surface curvature. FIG. 14C illustrates a distortion curve of the optical imaging lens assembly according to embodiment 7 to represent a distortion value under different viewing angles. FIG. 14D illustrates a lateral color curve of the optical imaging lens assembly according to embodiment 7 to represent deviation of different image heights on the imaging surface after the light passes through the lens. According to FIG. 14A to FIG. 14D, it can be seen that the optical imaging lens assembly provided in embodiment 7 can achieve high imaging quality.

Embodiment 8

Figure 15:
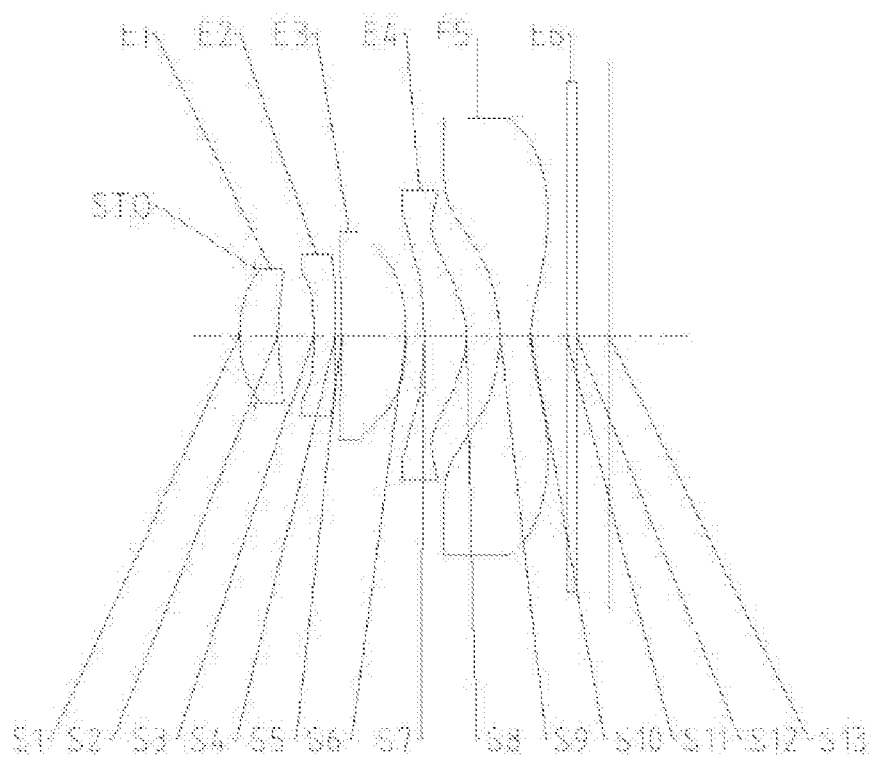
FIG. 15 is a schematic structure diagram of an optical imaging lens assembly according to embodiment 8 of the application.

An optical imaging lens assembly according to embodiment 8 of the application will be described below with reference to FIG. 15 to FIG. 16D. In the embodiment and the following embodiments, part of descriptions similar to the embodiment 1 are omitted for simplicity. FIG. 15 is a schematic structure diagram of an optical imaging lens assembly according to embodiment 8 of the application.

As shown in FIG. 15, the optical imaging lens assembly according to an exemplary implementation of the application includes a diaphragm STO, a first lens E1, a second lens E2, a third lens E3, a fourth lens E4, a fifth lens E5, an optical filter E6 and an imaging surface S13 which are provided in sequence from an object side to an image side along an optical axis.

The first lens E1 has a positive refractive power, an object-side surface S1 thereof is a convex surface, and an image-side surface S2 is a concave surface. The second lens E2 has a negative refractive power, an object-side surface S3 thereof is a concave surface, and an image-side surface S4 is a concave surface. The third lens E3 has a positive refractive power, an object-side surface S5 thereof is a concave surface, and an image-side surface S6 is a convex surface. The fourth lens E4 has a positive refractive power, an object-side surface S7 thereof is a convex surface, and an image-side surface S8 is a convex surface. The fifth lens E5 has a negative refractive power, an object-side surface S9 thereof is a convex surface, and an image-side surface S10 is a concave surface. The optical filter E6 has an object-side surface S11 and an image-side surface S12. Light from an object sequentially penetrates through each of the surfaces S1 to S12 and is finally image on the imaging surface S13.

Table 15 shows the surface type, the radius of curvature, the thickness, the material and the conic coefficient of each lens of the optical imaging lens assembly according to embodiment 8. Units of the radius of curvature and the thickness are millimeter (mm).

TABLE 15

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.3587 | | | |
| S1 | Aspherical | 1.4575 | 0.5655 | 1.50 | 81.6 | −0.0746 |
| S2 | Aspherical | 6.3630 | 0.2262 | | | 37.1990 |
| S3 | Aspherical | −800.0000 | 0.2102 | 1.82 | 24.1 | 99.0000 |
| S4 | Aspherical | 8.2761 | 0.3585 | | | 21.7332 |
| S5 | Aspherical | −22.1541 | 0.4823 | 1.54 | 56.1 | 97.9031 |
| S6 | Aspherical | −7.5839 | 0.5103 | | | 31.5259 |
| S7 | Aspherical | 6.5450 | 0.4329 | 1.54 | 56.1 | −2.1056 |
| S8 | Aspherical | −3.9732 | 0.6429 | | | 0.1868 |
| S9 | Aspherical | 2.3470 | 0.2405 | 1.54 | 55.7 | −61.3044 |
| S10 | Aspherical | 0.8408 | 0.2414 | | | −6.9235 |
| S11 | Spherical | Infinite | 0.1100 | 1.52 | 64.2 | |
| S12 | Spherical | Infinite | 0.3793 | | | |
| S13 | Spherical | Infinite | | | | |

Table 16 shows higher-order coefficients applied to each aspherical mirror surface in embodiment 8. The surface type of each aspherical surface may be defined by formula (1) given in embodiment 1.

Figure 16A:
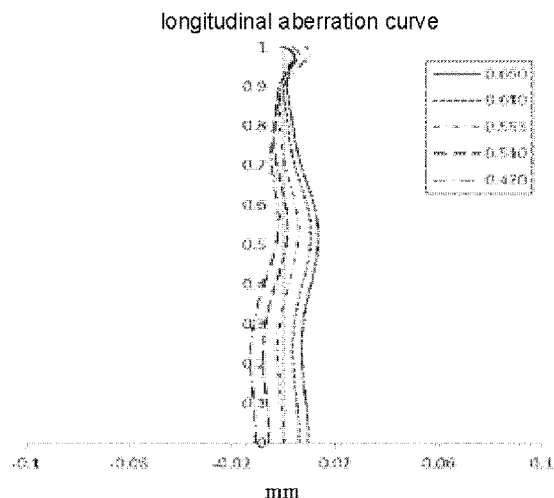
FIG. 16A to FIG. 16D illustrate a longitudinal aberration curve, an astigmatism curve, a distortion curve and a lateral color curve of an optical imaging lens assembly respectively according to embodiment 8.
Figure 16B:
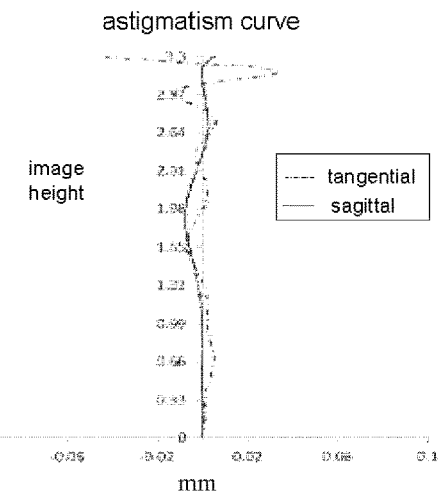
Figure 16C:
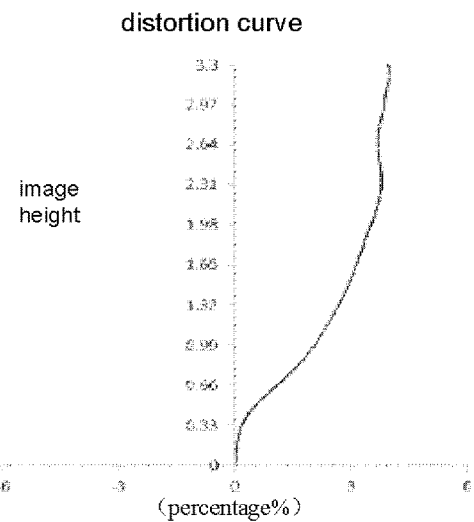
Figure 16D:
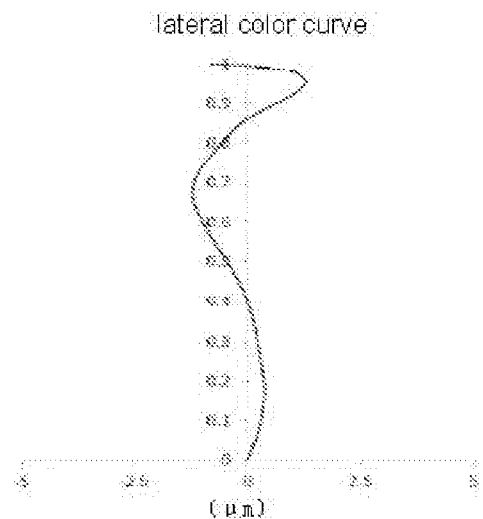

FIG. 16A illustrates a longitudinal aberration curve of the optical imaging lens assembly according to embodiment 8 to represent deviation of a convergence focal point after light with different wavelengths passes through the lens. FIG. 16B illustrates an astigmatism curve of the optical imaging lens assembly according to embodiment 8 to represent a tangential image surface curvature and a sagittal image surface curvature. FIG. 16C illustrates a distortion curve of the optical imaging lens assembly according to embodiment 8 to represent a distortion value under different viewing angles. FIG. 16D illustrates a lateral color curve of the optical imaging lens assembly according to embodiment 8 to represent deviation of different image heights on the imaging surface after the light passes through the lens. According to FIG. 16A to FIG. 16D, it can be seen that the optical imaging lens assembly provided in embodiment 8 can achieve high imaging quality.

Embodiment 9

Figure 17:
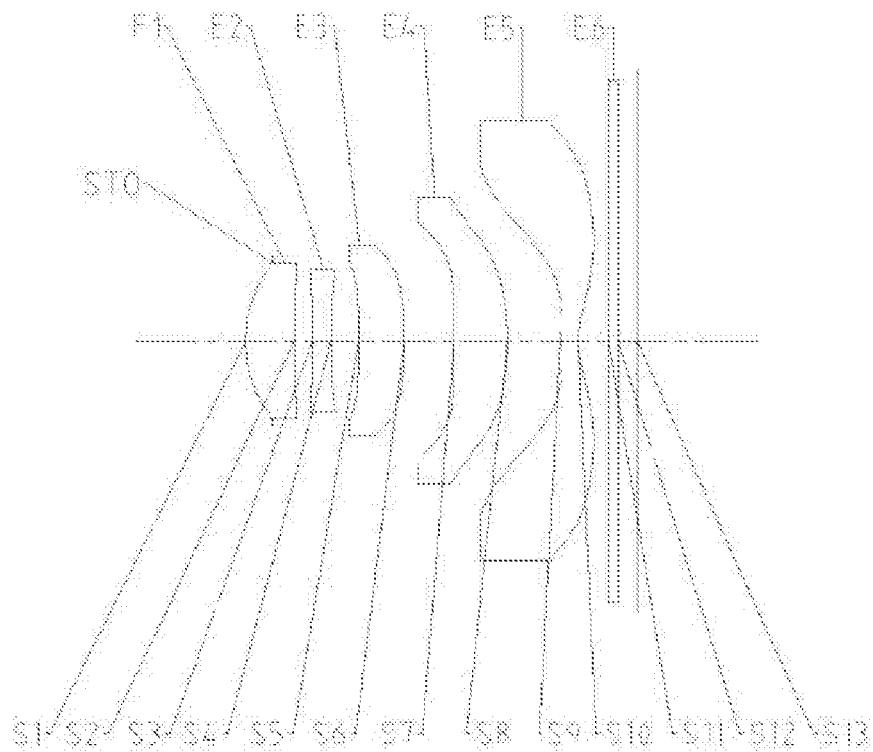
FIG. 17 is a schematic structure diagram of an optical imaging lens assembly according to embodiment 9 of the application.

An optical imaging lens assembly according to embodiment 9 of the application will be described below with reference to FIG. 17 to FIG. 18D. In the embodiment and the following embodiments, part of descriptions similar to the embodiment 1 are omitted for simplicity. FIG. 17 is a schematic structure diagram of an optical imaging lens assembly according to embodiment 9 of the application.

As shown in FIG. 17, the optical imaging lens assembly according to an exemplary implementation of the application includes a diaphragm STO, a first lens E1, a second lens E2, a third lens E3, a fourth lens E4, a fifth lens E5, an optical filter E6 and an imaging surface S13 which are provided in sequence from an object side to an image side along an optical axis.

The first lens E1 has a positive refractive power, an object-side surface S1 thereof is a convex surface, and an image-side surface S2 is a convex surface. The second lens E2 has a negative refractive power, an object-side surface S3 thereof is a convex surface, and an image-side surface S4 is a concave surface. The third lens E3 has a positive refractive power, an object-side surface S5 thereof is a convex surface, and an image-side surface S6 is a convex surface. The fourth lens E4 has a positive refractive power, an object-side surface S7 thereof is a convex surface, and an image-side surface S8 is a convex surface. The fifth lens E5 has a negative refractive power, an object-side surface S9 thereof is a convex surface, and an image-side surface S10 is a concave surface. The optical filter E6 has an object-side surface S11 and an image-side surface S12. Light from an

TABLE 16

| Surface number | A4 | A6 | A5 | A10 | A12 | A14 | A16 | A18 | A20 |
|---|---|---|---|---|---|---|---|---|---|
| S1 | 6.9584E−03 | 2.1236E−02 | −1.1001E−01 | 3.6116E−01 | −5.5837E−01 | 4.2711E−01 | −1.3107E−01 | 0.0000E+00 | 0.0000E+00 |
| S2 | −4.7921E−02 | 7.6317E−02 | −4.3579E−01 | 1.2835E+00 | −2.0989E+00 | 1.7379E+00 | −5.8891E−01 | 0.0000E+00 | 0.0000E+00 |
| S3 | −8.2677E−02 | 1.2369E−01 | −1.2430E−01 | 3.3247E−01 | −6.8745E−01 | 7.1447E−01 | −2.8362E−01 | 0.0000E+00 | 0.0000E+00 |
| S4 | −6.8901E−02 | 1.8520E−01 | −3.5221E−01 | 1.0171E+00 | −1.7409E+00 | 1.5471E+00 | −4.9974E−01 | 0.0000E+00 | 0.0000E+00 |
| S5 | −1.4893E−01 | 6.6189E−04 | −1.0154E−01 | 6.4010E−01 | −2.6142E+00 | 6.0258E+00 | −7.9479E+00 | 5.5489E+00 | −1.5393E+00 |
| S6 | −1.2885E−01 | 3.8263E−02 | −3.3996E−01 | 1.2218E+00 | −2.4996E+00 | 3.0557E+00 | −2.2024E+00 | 8.5954E−01 | −1.3715E−01 |
| S7 | −9.6573E−04 | −5.0026E−02 | 1.8740E−02 | 8.5988E−03 | −3.8601E−02 | 3.5528E−02 | −1.5662E−02 | 3.5480E−03 | −3.2968E−04 |
| S8 | 4.3023E−02 | −1.9314E−02 | −5.1666E−03 | 1.2659E−02 | −2.0802E−02 | 1.5611E−02 | −5.5242E−03 | 9.3167E−04 | −6.0843E−05 |
| S9 | −6.0541E−01 | 5.4909E−01 | −3.3226E−01 | 1.4237E−01 | −4.0855E−02 | 7.5724E−03 | −8.6856E−04 | 5.6100E−05 | −1.5618E−06 |
| S10 | −2.3257E−01 | 1.8701E−01 | −9.8551E−02 | 3.4696E−02 | −8.1013E−03 | 1.2206E−03 | −1.1297E−04 | 5.8128E−06 | −1.2691E−07 | object sequentially penetrates through each of the surfaces S1 to S12 and is finally image on the imaging surface S13.

Table 17 shows the surface type, the radius of curvature, the thickness, the material and the conic coefficient of each lens of the optical imaging lens assembly according to embodiment 9. Units of the radius of curvature and the thickness are millimeter (mm).

TABLE 17

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.2328 | | | |
| S1 | Aspherical | 1.6602 | 0.6521 | 1.50 | 81.6 | −0.3302 |
| S2 | Aspherical | −900.0000 | 0.0863 | | | 99.0000 |
| S3 | Aspherical | 6.4893 | 0.2104 | 1.82 | 24.1 | 44.7600 |
| S4 | Aspherical | 3.1725 | 0.3663 | | | 8.9169 |
| S5 | Aspherical | 800.0000 | 0.5372 | 1.54 | 56.1 | −99.0000 |
| S6 | Aspherical | −6.7642 | 0.4653 | | | 33.5205 |
| S7 | Aspherical | 4.6374 | 0.4995 | 1.54 | 56.1 | −28.5345 |
| S8 | Aspherical | −12.3419 | 0.6400 | | | 27.2790 |
| S9 | Aspherical | 2.1812 | 0.2126 | 1.54 | 55.7 | −96.7402 |
| S10 | Aspherical | 0.7608 | 0.3472 | | | −8.8282 |
| S11 | Spherical | Infinite | 0.1100 | 1.52 | 64.2 | |
| S12 | Spherical | Infinite | 0.1731 | | | |
| S13 | Spherical | Infinite | | | | |

Table 18 shows higher-order coefficients applied to each aspherical mirror surface in embodiment 9. The surface type of each aspherical surface may be defined by formula (1) given in embodiment 1.

TABLE 18

| Surface number | A4 | A6 | A8 | A10 | A12 | A14 | A16 | A18 |
|---|---|---|---|---|---|---|---|---|
| S1 | −8.4949E−03 | −5.9612E−02 | 1.9518E−01 | −5.6672E−01 | 8.0844E−01 | −6.1580E−01 | 1.8762E−01 | 0.0000E+00 |
| S2 | −1.5442E−01 | 2.2802E−01 | −1.5505E−01 | −3.6952E−01 | 8.1036E−01 | −6.1859E−01 | 1.7001E−01 | 0.0000E+00 |
| S3 | −1.6002E−01 | 4.1036E−01 | −5.1082E−01 | 4.6405E−01 | −6.2955E−01 | 8.1310E−01 | −4.3801E−01 | 0.0000E+00 |
| S4 | −9.8090E−02 | 3.2405E−01 | −5.5712E−01 | 9.8667E−01 | −1.5745E+00 | 1.5496E+00 | −6.3521E−01 | 0.0000E+00 |
| S5 | −1.2435E−01 | 1.7047E−01 | −9.7468E−01 | 3.6171E+00 | −3.4881E+00 | 1.1256E+01 | −8.2108E+00 | 2.4930E+00 |
| S6 | −1.5803E−01 | 1.5653E−01 | −5.3042E−01 | 1.2106E+00 | −1.8803E+00 | 1.9236E+00 | −1.2644E+00 | 4.8538E−01 |
| S7 | −5.5668E−02 | −1.2773E−01 | 3.8876E−01 | −9.4899E−01 | 1.3204E+00 | −1.1302E+00 | 5.8247E−01 | −1.6425E−01 |
| S8 | −6.4604E−02 | 8.1700E−02 | −1.8544E−01 | 2.0363E−01 | −1.6169E−01 | 8.7051E−02 | −2.7381E−02 | 4.4367E−03 |
| S9 | −1.0319E+00 | 1.3722E+00 | −1.1904E+00 | 6.4434E−01 | −2.1175E−01 | 4.1672E−02 | −4.6688E−03 | 2.5817E−04 |
| S10 | −3.9994E−01 | 4.5661E−01 | −3.2382E−01 | 1.4883E−01 | −4.4929E−02 | 8.8247E−03 | −1.0858E−03 | 7.6017E−05 |

Figure 18A:
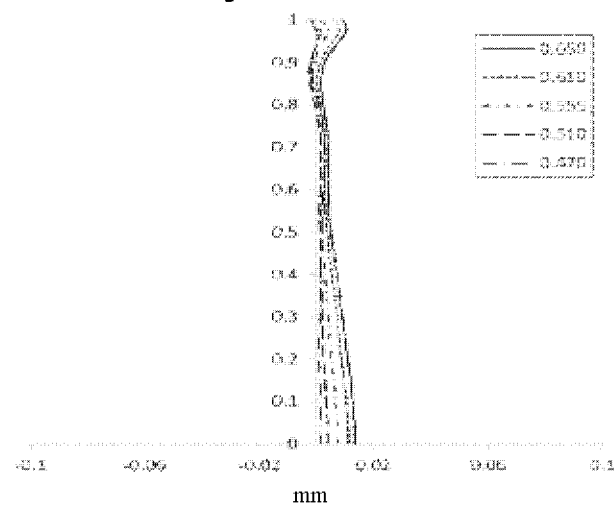
FIG. 18A to FIG. 18D illustrate a longitudinal aberration curve, an astigmatism curve, a distortion curve and a lateral color curve of an optical imaging lens assembly respectively according to embodiment 9.
Figure 18B:
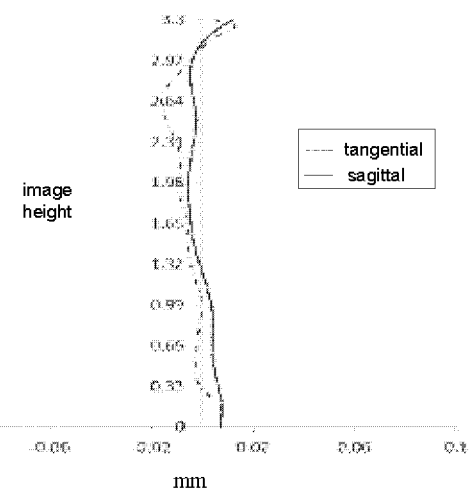
Figure 18C:
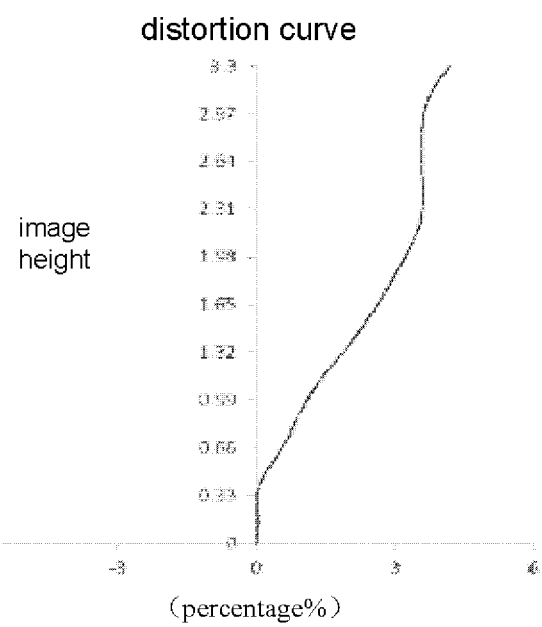
Figure 18D:
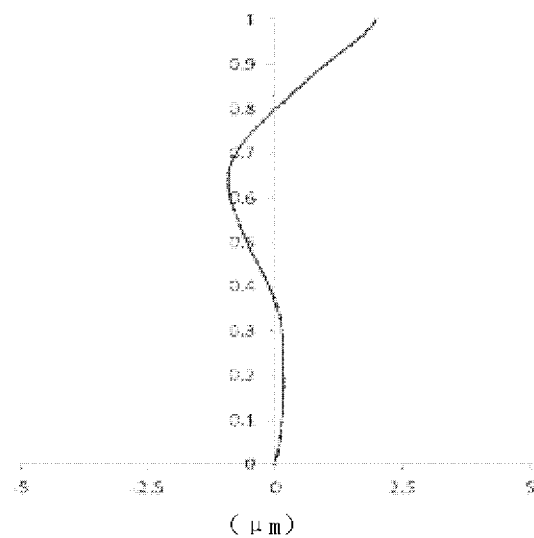

FIG. 18A illustrates a longitudinal aberration curve of the optical imaging lens assembly according to embodiment 9 to represent deviation of a convergence focal point after light with different wavelengths passes through the lens. FIG. 18B illustrates an astigmatism curve of the optical imaging lens assembly according to embodiment 9 to represent a tangential image surface curvature and a sagittal image surface curvature. FIG. 18C illustrates a distortion curve of the optical imaging lens assembly according to embodiment 9 to represent a distortion value under different viewing angles. FIG. 18D illustrates a lateral color curve of the optical imaging lens assembly according to embodiment 9 to represent deviation of different image heights on the imaging surface after the light passes through the lens. According to FIG. 18A to FIG. 18D, it can be seen that the optical imaging lens assembly provided in embodiment 9 can achieve high imaging quality.

Embodiment 10

Figure 19:
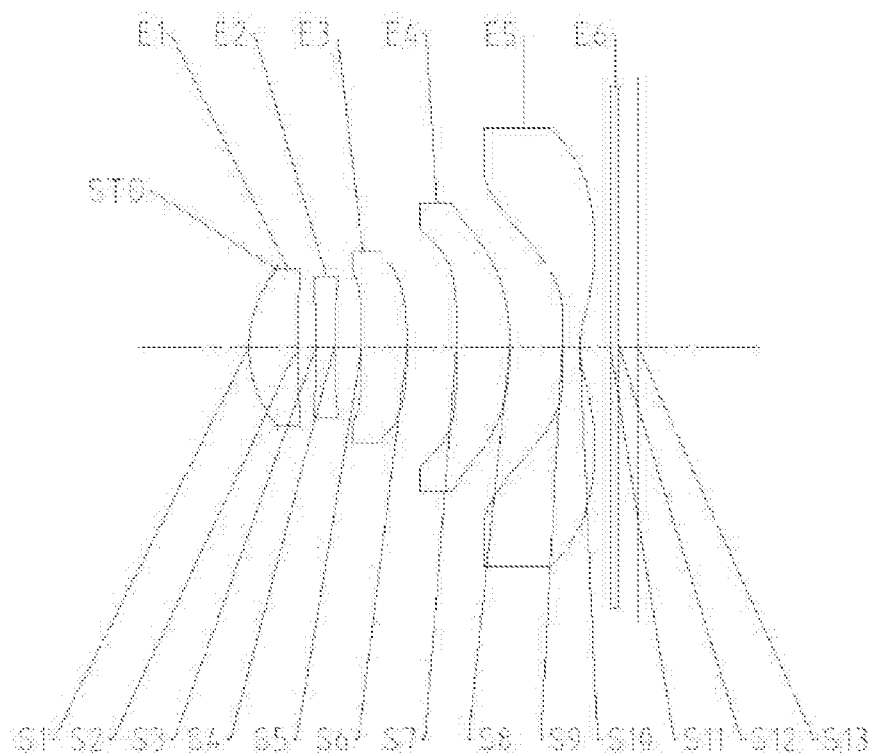
FIG. 19 is a schematic structure diagram of an optical imaging lens assembly according to embodiment 10 of the application.

An optical imaging lens assembly according to embodiment 10 of the application will be described below with reference to FIG. 19 to FIG. 20D. In the embodiment and the following embodiments, part of descriptions similar to the embodiment 1 are omitted for simplicity. FIG. 19 is a schematic structure diagram of an optical imaging lens assembly according to embodiment 10 of the application.

As shown in FIG. 19, the optical imaging lens assembly according to an exemplary implementation of the application includes a diaphragm STO, a first lens E1, a second lens E2, a third lens E3, a fourth lens E4, a fifth lens E5, an optical filter E6 and an imaging surface S13 which are provided in sequence from an object side to an image side along an optical axis.

The first lens E1 has a positive refractive power, an object-side surface S1 thereof is a convex surface, and an image-side surface S2 is a concave surface. The second lens E2 has a negative refractive power, an object-side surface S3 thereof is a concave surface, and an image-side surface S4 is a concave surface. The third lens E3 has a positive refractive power, an object-side surface S5 thereof is a concave surface, and an image-side surface S6 is a convex surface. The fourth lens E4 has a positive refractive power, an object-side surface S7 thereof is a concave surface, and an image-side surface S8 is a convex surface. The fifth lens E5 has a negative refractive power, an object-side surface S9 thereof is a convex surface, and an image-side surface S10 is a concave surface. The optical filter E6 has an object-side surface S11 and an image-side surface S12. Light from an object sequentially penetrates through each of the surfaces S1 to S12 and is finally image on the imaging surface S13.

Table 19 shows the surface type, the radius of curvature, the thickness, the material and the conic coefficient of each lens of the optical imaging lens assembly according to embodiment 10. Units of the radius of curvature and the thickness are millimeter (mm).

TABLE 19

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.3050 | | | |
| S1 | Aspherical | 1.4497 | 0.5629 | 1.50 | 81.6 | −0.1395 |
| S2 | Aspherical | 9.3699 | 0.2096 | | | 46.9770 |
| S3 | Aspherical | −18.7156 | 0.2100 | 1.82 | 24.1 | −99.0000 |

TABLE 19-continued

| Surface number | Surface type | Radius of curvature | Thickness | Material Refractive index | Abbe number | Conic coefficient |
|---|---|---|---|---|---|---|
| S4 | Aspherical | 8.9542 | 0.3181 | | | 88.9022 |
| S5 | Aspherical | −106.0898 | 0.5246 | 1.54 | 56.1 | −99.0000 |
| S6 | Aspherical | −5.8420 | 0.5693 | | | 23.7623 |
| S7 | Aspherical | −500.0000 | 0.6171 | 1.54 | 56.1 | 99.0000 |
| S8 | Aspherical | −2.8760 | 0.6000 | | | −0.1689 |
| S9 | Aspherical | 2.7142 | 0.2100 | 1.54 | 55.7 | −99.0000 |
| S10 | Aspherical | 0.8804 | 0.3500 | | | −7.4436 |
| S11 | Spherical | Infinite | 0.1100 | 1.52 | 64.2 | |
| S12 | Spherical | Infinite | 0.2184 | | | |
| S13 | Spherical | Infinite | | | | |

Table 20 shows higher-order coefficients applied to each aspherical mirror surface in embodiment 10. The surface type of each aspherical surface may be defined by formula (1) given in embodiment 1.

TABLE 20

| Surface number | A4 | A6 | A5 | A10 | A12 | A14 | A16 | A18 | A20 |
|---|---|---|---|---|---|---|---|---|---|
| S1 | 1.2102E−02 | −3.6667E−02 | 3.9315E−01 | −2.0804E+00 | 6.6892E+00 | −1.3121E+01 | 1.5306E+01 | −9.7435E+00 | 2.5994E+00 |
| S2 | −2.7793E−02 | −5.7954E−02 | 6.9367E−01 | −3.9192E+00 | 1.3178E+01 | −2.7278E+01 | 3.3797E+01 | −2.2932E+01 | 6.5363E+00 |
| S3 | −5.1598E−02 | 9.0695E−02 | 1.8610E−01 | −8.4080E−01 | 1.4950E+00 | −1.2807E+00 | 4.4588E−01 | 0.0000E+00 | 0.0000E+00 |
| S4 | −4.9963E−02 | 1.6293E−01 | −2.2407E−01 | 6.1297E−01 | −1.2593E+00 | 1.3806E+00 | −5.3640E−01 | 0.0000E+00 | 0.0000E+00 |
| S5 | −1.4258E−01 | 6.1816E−02 | −6.3860E−01 | 3.1967E+00 | −1.0210E+01 | 1.9723E+01 | −2.2568E+01 | 1.3937E+01 | −3.4699E+00 |
| S6 | −1.0283E−01 | −3.1271E−02 | 1.2947E−01 | −5.4760E−01 | 1.3757E+00 | −2.1127E+00 | 1.9417E+00 | −9.8376E−01 | 2.1432E−01 |
| S7 | −5.7902E−02 | −4.5163E−02 | −6.0536E−03 | −1.9995E−02 | 7.9500E−02 | −1.1559E−01 | 8.8836E−02 | −3.3284E−02 | 4.7711E−03 |
| S8 | −9.6767E−03 | 2.6784E−02 | −1.6970E−01 | 2.5786E−01 | −2.2869E−01 | 1.2635E−01 | −4.0954E−02 | 7.0468E−03 | −4.9604E−04 |
| S9 | −6.3104E−01 | 6.9131E−01 | −6.2813E−01 | 4.2856E−01 | −1.9530E−01 | 5.6985E−02 | −1.0203E−02 | 1.0203E−03 | −4.3632E−05 |
| S10 | −2.2180E−01 | 1.9965E−01 | −1.2725E−01 | 5.5922E−02 | −1.6491E−02 | 3.1760E−03 | −3.8280E−04 | 2.6205E−05 | −7.7669E−07 |

Figure 20A:
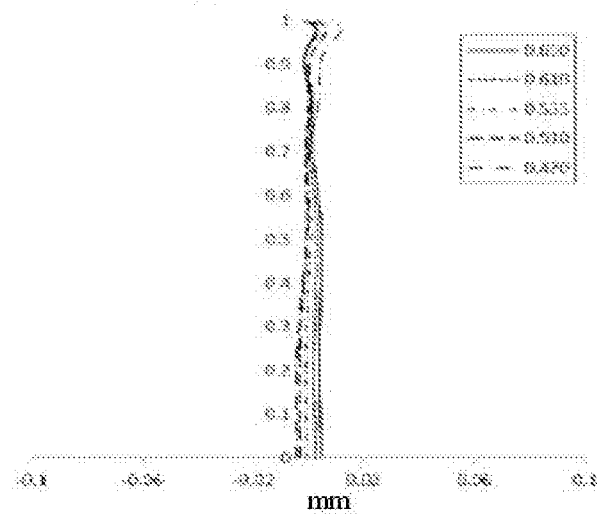
FIG. 20A to FIG. 20D illustrate a longitudinal aberration curve, an astigmatism curve, a distortion curve and a lateral color curve of an optical imaging lens assembly respectively according to embodiment 10.
Figure 20B:
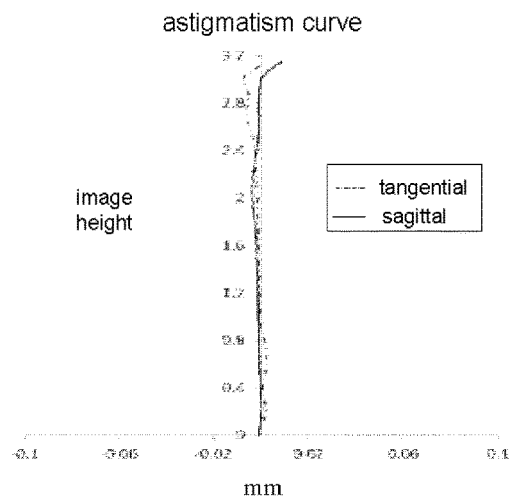
Figure 20C:
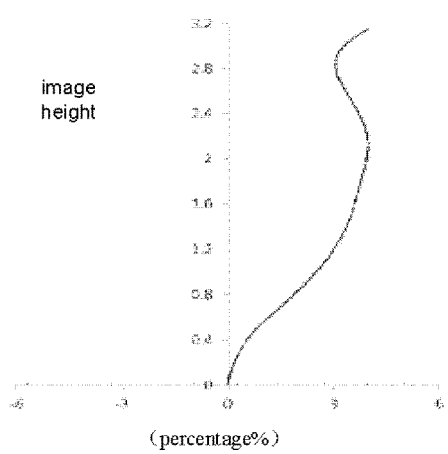
Figure 20D:
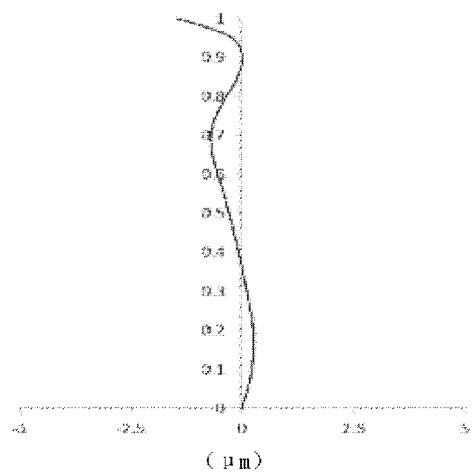

FIG. 20A illustrates a longitudinal aberration curve of the optical imaging lens assembly according to embodiment 10 to represent deviation of a convergence focal point after light with different wavelengths passes through the lens. FIG. 20B illustrates an astigmatism curve of the optical imaging lens assembly according to embodiment 10 to represent a tangential image surface curvature and a sagittal image surface curvature. FIG. 20C illustrates a distortion curve of the optical imaging lens assembly according to embodiment 10 to represent a distortion value under different viewing angles. FIG. 20D illustrates a lateral color curve of the optical imaging lens assembly according to embodiment 10 to represent deviation of different image heights on the imaging surface after the light passes through the lens. According to FIG. 20A to FIG. 20D, it can be seen that the optical imaging lens assembly provided in embodiment 10 can achieve high imaging quality.

Embodiment 11

Figure 21:
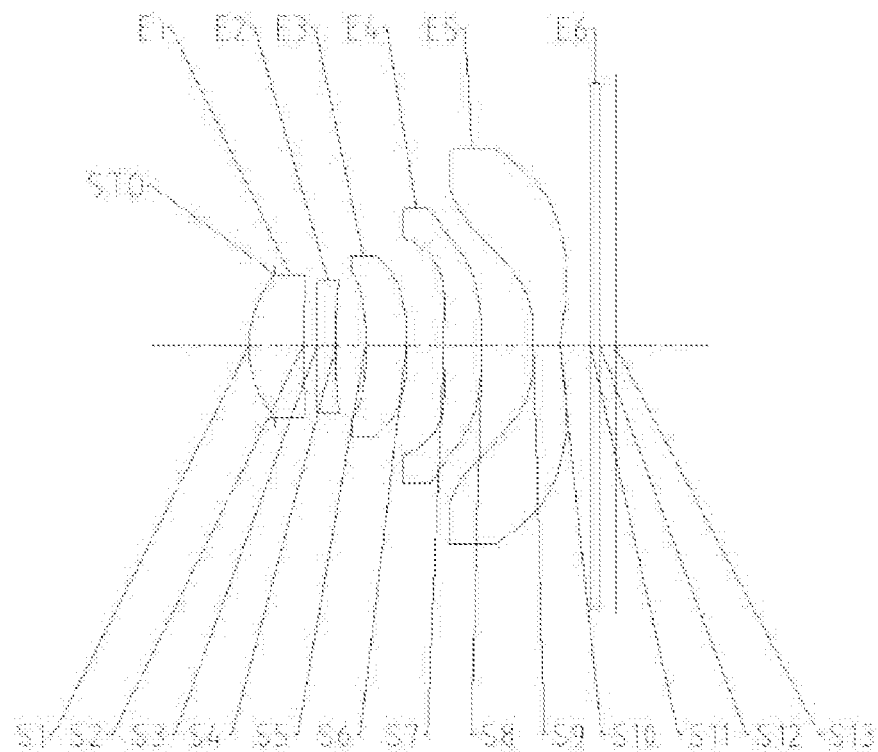
FIG. 21 is a schematic structure diagram of an optical imaging lens assembly according to embodiment 11 of the application.

An optical imaging lens assembly according to embodiment 11 of the application will be described below with reference to FIG. 21 to FIG. 22D. In the embodiment and the following embodiments, part of descriptions similar to the embodiment 1 are omitted for simplicity. FIG. 21 is a schematic structure diagram of an optical imaging lens assembly according to embodiment 11 of the application.

As shown in FIG. 21, the optical imaging lens assembly according to an exemplary implementation of the application includes a diaphragm STO, a first lens E1, a second lens E2, a third lens E3, a fourth lens E4, a fifth lens E5, an optical filter E6 and an imaging surface S13 which are provided in sequence from an object side to an image side along an optical axis.

The first lens E1 has a positive refractive power, an object-side surface S1 thereof is a convex surface, and an image-side surface S2 is a concave surface. The second lens E2 has a negative refractive power, an object-side surface S3 thereof is a concave surface, and an image-side surface S4 is a concave surface. The third lens E3 has a positive refractive power, an object-side surface S5 thereof is a concave surface, and an image-side surface S6 is a convex surface. The fourth lens E4 has a positive refractive power, an object-side surface S7 thereof is a convex surface, and an image-side surface S8 is a convex surface. The fifth lens E5 has a negative refractive power, an object-side surface S9 thereof is a concave surface, and an image-side surface S10 is a concave surface. The optical filter E6 has an object-side surface S11 and an image-side surface S12. Light from an object sequentially penetrates through each of the surfaces S1 to S12 and is finally image on the imaging surface S13.

Table 21 shows the surface type, the radius of curvature, the thickness, the material and the conic coefficient of each lens of the optical imaging lens assembly according to embodiment 11. Units of the radius of curvature and the thickness are millimeter (mm).

TABLE 21

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −0.2828 | | | |
| S1 | Aspherical | 1.2943 | 0.6193 | 1.50 | 81.6 | −0.1915 |
| S2 | Aspherical | 6.6691 | 0.1600 | | | −18.8826 |
| S3 | Aspherical | −39.2204 | 0.2100 | 2.00 | 19.3 | −74.0972 |
| S4 | Aspherical | 11.6743 | 0.3447 | | | 87.7173 |
| S5 | Aspherical | −7.0702 | 0.4693 | 1.54 | 56.1 | 50.0998 |
| S6 | Aspherical | −5.0623 | 0.4265 | | | 19.3639 |
| S7 | Aspherical | 7.1169 | 0.4309 | 1.54 | 56.1 | 15.2045 |
| S8 | Aspherical | −6.2526 | 0.5928 | | | 11.3832 |
| S9 | Aspherical | −633.0737 | 0.3093 | 1.54 | 55.7 | −99.0000 |
| S10 | Aspherical | 1.2164 | 0.3504 | | | −11.6327 |
| S11 | Spherical | Infinite | 0.1100 | 1.52 | 64.2 | |
| S12 | Spherical | Infinite | 0.1769 | | | |
| S13 | Spherical | Infinite | | | | |

Table 22 shows higher-order coefficients applied to each aspherical mirror surface in embodiment 11. The surface type of each aspherical surface may be defined by formula (1) given in embodiment 1.

TABLE 22

| Surface number | A4 | A6 | A8 | A10 | A12 | A14 | A16 | A18 | A20 |
|---|---|---|---|---|---|---|---|---|---|
| S1 | 1.1975E−02 | 3.4638E−02 | −3.3912E−01 | 2.2459E+00 | −8.6546E+00 | 2.0214E+01 | −2.8175E+01 | 2.1486E+01 | −6.9025E+00 |
| S2 | −4.1705E−02 | 7.6302E−02 | −8.7772E−01 | 6.0803E+00 | −2.5366E+01 | 6.4085E+01 | −9.6524E+01 | 7.9696E+01 | −2.7800E+01 |
| S3 | −5.6576E−02 | 1.1332E−01 | 1.1458E−01 | −4.4915E−01 | 7.1298E−01 | −4.5888E−01 | 6.6732E−02 | 0.0000E+00 | 0.0000E+00 |
| S4 | −2.4861E−02 | 1.9786E−01 | −2.7144E−01 | 1.0695E+00 | −2.2342E+00 | 2.4615E+00 | −8.2143E−01 | 0.0000E+00 | 0.0000E+00 |
| S5 | −1.7409E−01 | 1.1304E−01 | −7.3799E−01 | 2.9775E+00 | −8.8470E+00 | 1.6668E+01 | −1.8449E+01 | 1.0033E+01 | −1.3551E+00 |
| S6 | −1.9023E−01 | 5.9438E−02 | 8.5164E−02 | −1.0522E+00 | 3.3159E+00 | −5.7017E+00 | 5.7074E+00 | −3.1443E+00 | 7.4722E−01 |
| S7 | −1.7508E−01 | 1.0512E−01 | −5.0910E−01 | 1.3754E+00 | −2.3217E+00 | 2.9339E+00 | −1.9810E+00 | 7.3114E−01 | −1.1450E−01 |
| S8 | −1.2612E−01 | 1.3612E−01 | −2.7006E−01 | 3.8450E−01 | −4.3589E−01 | 3.2778E−01 | −1.4028E−01 | 3.0834E−02 | −2.7130E−03 |
| S9 | −9.7236E−01 | 1.3645E+00 | −1.2940E+00 | 8.1551E−01 | −3.3530E−01 | 9.0609E−02 | −1.5859E−02 | 1.6571E−03 | −7.8968E−05 |
| S10 | −3.8837E−01 | 4.6049E−01 | −3.5204E−01 | 1.7784E−01 | −6.0028E−02 | 1.3314E−02 | −1.8573E−03 | 1.4735E−04 | −5.0506E−06 |

Figure 22A:
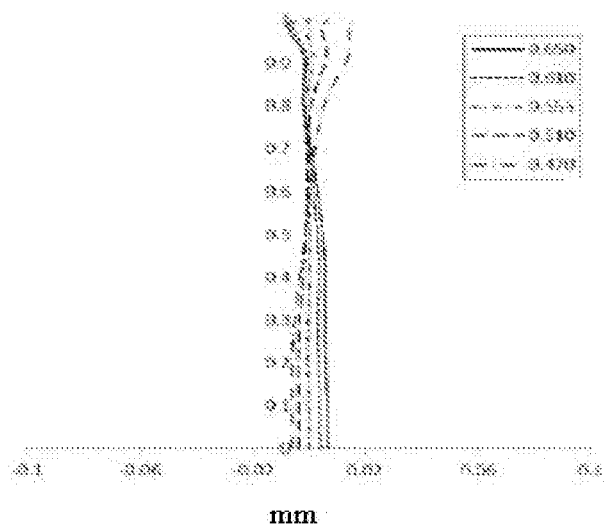
FIG. 22A to FIG. 22D illustrate a longitudinal aberration curve, an astigmatism curve, a distortion curve and a lateral color curve of an optical imaging lens assembly respectively according to embodiment 11.
Figure 22B:
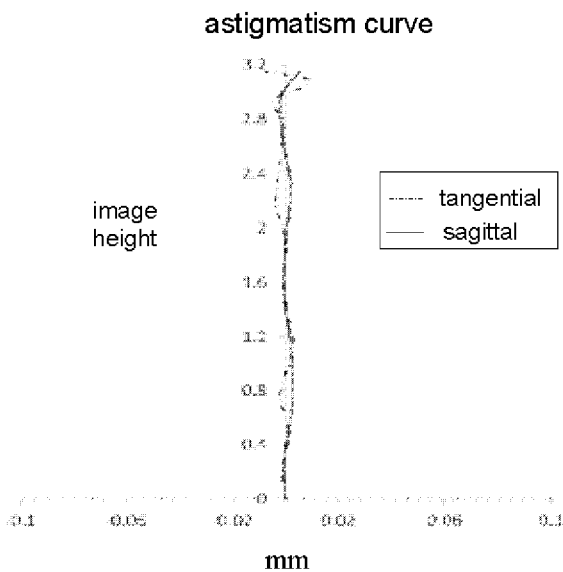
Figure 22C:
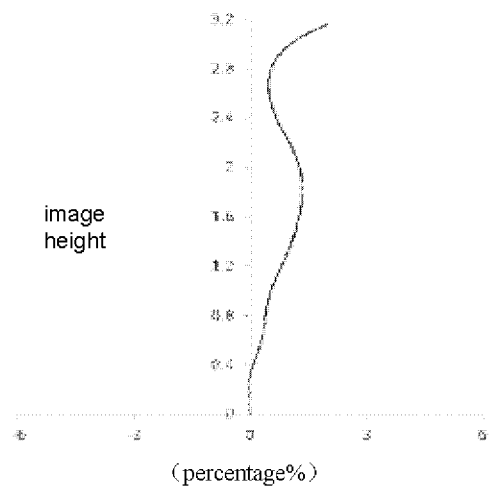
Figure 22D:
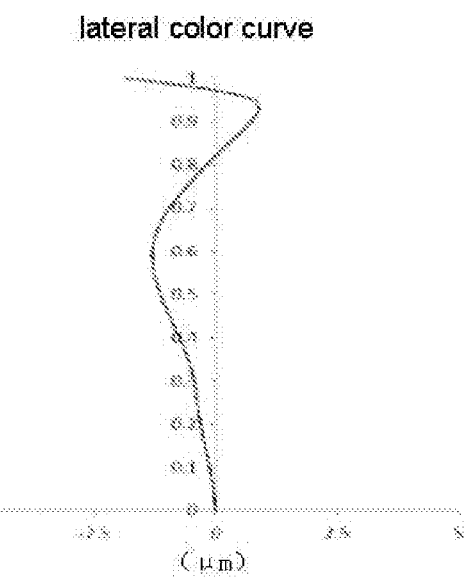

FIG. 22A illustrates a longitudinal aberration curve of the optical imaging lens assembly according to embodiment 11 to represent deviation of a convergence focal point after light with different wavelengths passes through the lens. FIG. 22B illustrates an astigmatism curve of the optical imaging lens assembly according to embodiment 11 to represent a tangential image surface curvature and a sagittal image surface curvature. FIG. 22C illustrates a distortion curve of the optical imaging lens assembly according to embodiment 11 to represent a distortion value under different viewing angles. FIG. 22D illustrates a lateral color curve of the optical imaging lens assembly according to embodiment 11 to represent deviation of different image heights on the imaging surface after the light passes through the lens. According to FIG. 22A to FIG. 22D, it can be seen that the optical imaging lens assembly provided in embodiment 11 can achieve high imaging quality.

Embodiment 12

Figure 23:
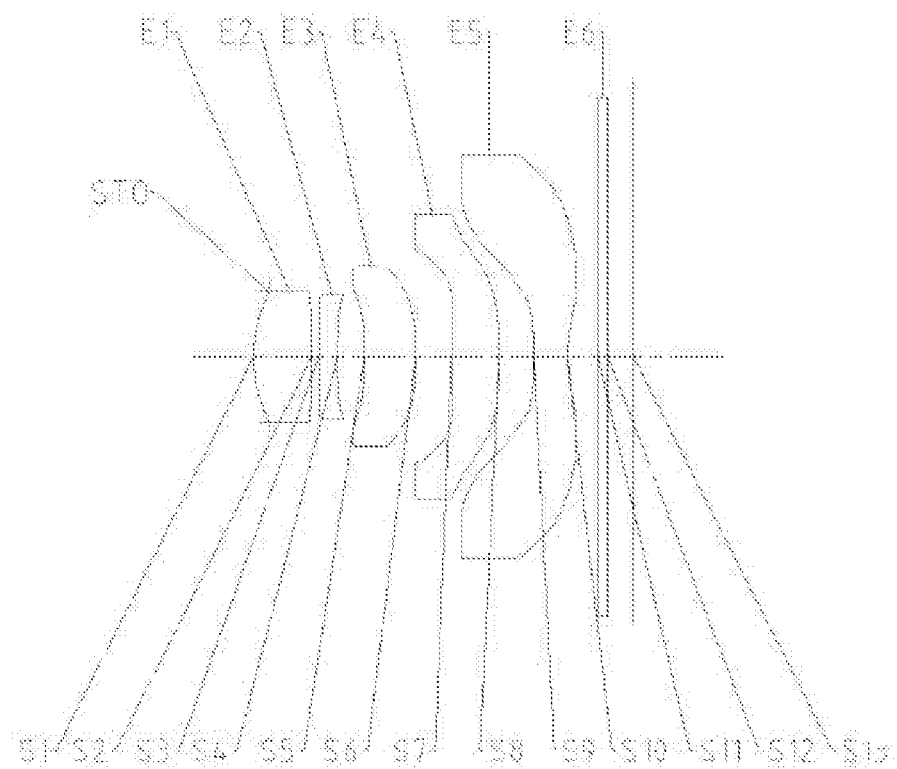
FIG. 23 is a schematic structure diagram of an optical imaging lens assembly according to embodiment 12 of the application.

An optical imaging lens assembly according to embodiment 12 of the application will be described below with reference to FIG. 23 to FIG. 24D. In the embodiment and the following embodiments, part of descriptions similar to the embodiment 1 are omitted for simplicity. FIG. 23 is a schematic structure diagram of an optical imaging lens assembly according to embodiment 12 of the application.

As shown in FIG. 23, the optical imaging lens assembly according to an exemplary implementation of the application includes a diaphragm STO, a first lens E1, a second lens E2, a third lens E3, a fourth lens E4, a fifth lens E5, an optical filter E6 and an imaging surface S13 which are provided in sequence from an object side to an image side along an optical axis.

The first lens E1 has a positive refractive power, an object-side surface S1 thereof is a convex surface, and an image-side surface S2 is a convex surface. The second lens E2 has a negative refractive power, an object-side surface S3 thereof is a concave surface, and an image-side surface S4 is a concave surface. The third lens E3 has a positive refractive power, an object-side surface S5 thereof is a concave surface, and an image-side surface S6 is a convex surface. The fourth lens E4 has a positive refractive power, an object-side surface S7 thereof is a convex surface, and an image-side surface S8 is a convex surface. The fifth lens E5 has a negative refractive power, an object-side surface S9 thereof is a convex surface, and an image-side surface S10 is a concave surface. The optical filter E6 has an object-side surface S11 and an image-side surface S12. Light from an object sequentially penetrates through each of the surfaces S1 to S12 and is finally image on the imaging surface S13.

Table 23 shows the surface type, the radius of curvature, the thickness, the material and the conic coefficient of each lens of the optical imaging lens assembly according to embodiment 12. Units of the radius of curvature and the thickness are millimeter (mm).

TABLE 23

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −0.1482 | | | |
| S1 | Aspherical | 1.5268 | 0.6604 | 1.55 | 71.7 | −0.7392 |
| S2 | Aspherical | −200.0000 | 0.0800 | | | −99.0000 |
| S3 | Aspherical | −120.9422 | 0.2100 | 2.00 | 19.3 | 99.0000 |
| S4 | Aspherical | 7.7455 | 0.3049 | | | 85.4401 |
| S5 | Aspherical | −5.5705 | 0.5800 | 1.54 | 56.1 | 2.6473 |
| S6 | Aspherical | −4.6642 | 0.4021 | | | 14.9531 |
| S7 | Aspherical | 5.6427 | 0.5398 | 1.54 | 56.1 | 12.7772 |
| S8 | Aspherical | −7.0171 | 0.3885 | | | 10.0262 |
| S9 | Aspherical | 21.7684 | 0.3800 | 1.54 | 55.7 | 94.8695 |
| S10 | Aspherical | 1.2701 | 0.3536 | | | −9.1919 |
| S11 | Spherical | Infinite | 0.1100 | 1.52 | 64.2 | |
| S12 | Spherical | Infinite | 0.2912 | | | |
| S13 | Spherical | Infinite | | | | |

Table 24 shows higher-order coefficients applied to each aspherical mirror surface in embodiment 12. The surface type of each aspherical surface may be defined by formula (1) given in embodiment 1.

TABLE 24

| Surface number | A4 | A6 | A5 | A10 | A12 | A14 | A16 | A18 | A20 |
|---|---|---|---|---|---|---|---|---|---|
| S1 | 6.6065E−03 | 2.4325E−02 | −8.6356E−01 | 8.1363E+00 | −4.3843E+01 | 1.3811E+02 | −2.5387E+02 | 2.5198E+02 | −1.0434E+02 |
| S2 | −1.3859E−01 | 1.6540E−01 | −3.3426E−01 | 2.6169E+00 | −1.7695E+01 | 5.7791E+01 | −9.2487E+01 | 6.3826E+01 | −1.0417E+01 |
| S3 | −4.3304E−02 | 2.8629E−01 | 2.1969E−01 | −2.4290E+00 | 5.9432E+00 | −5.2349E+00 | 5.6436E−01 | 0.0000E+00 | 0.0000E+00 |
| S4 | −1.5457E−02 | 3.1770E−01 | −8.7179E−01 | 3.6894E+00 | −1.1321E+01 | 1.9750E+01 | −1.3407E+01 | 0.0000E+00 | 0.0000E+00 |
| S5 | −2.1013E−01 | 1.7598E−01 | −1.2303E+00 | 5.7273E+00 | −2.1835E+01 | 6.0749E+01 | −1.1143E+02 | 1.1965E+02 | −5.4038E+01 |
| S6 | −2.1827E−01 | 1.6478E−01 | −6.2960E−01 | 2.0629E+00 | −4.8525E+00 | 7.4115E+00 | −6.8798E+00 | 3.5122E+00 | −7.2803E−01 |
| S7 | −1.8317E−01 | 8.3833E−02 | −4.5509E−01 | 9.8601E−01 | −1.4835E+00 | 1.4677E+00 | −9.4066E−01 | 3.6410E−01 | −6.4437E−02 |
| S8 | −1.3585E−01 | 1.9206E−01 | −5.6717E−01 | 9.2021E−01 | −9.3052E−01 | 5.9754E−01 | −2.2920E−01 | 4.7322E−02 | −4.0360E−03 |
| S9 | −7.4211E−01 | 8.2654E−01 | −9.8209E−01 | 9.9755E−01 | −6.7477E−01 | 2.9125E−01 | −7.7560E−02 | 1.1603E−02 | −7.4451E−04 |
| S10 | −2.4583E−01 | 2.0899E−01 | −1.3499E−01 | 6.5070E−02 | −2.1939E−02 | 4.8472E−03 | −6.5923E−04 | 4.9398E−05 | −1.5304E−06 |

Figure 24A:
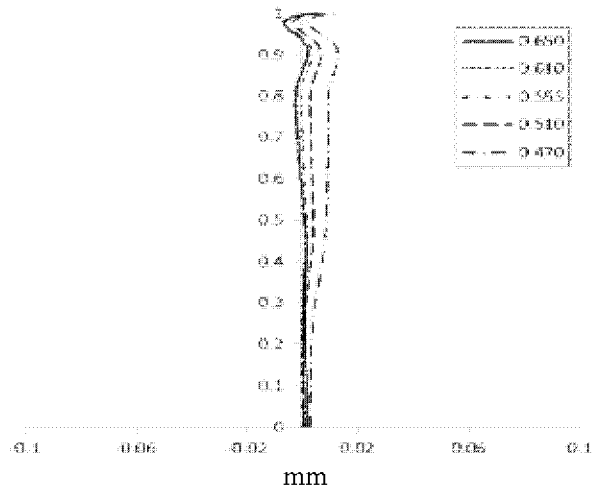
FIG. 24A to FIG. 24D illustrate a longitudinal aberration curve, an astigmatism curve, a distortion curve and a lateral color curve of an optical imaging lens assembly respectively according to embodiment 12.
Figure 24B:
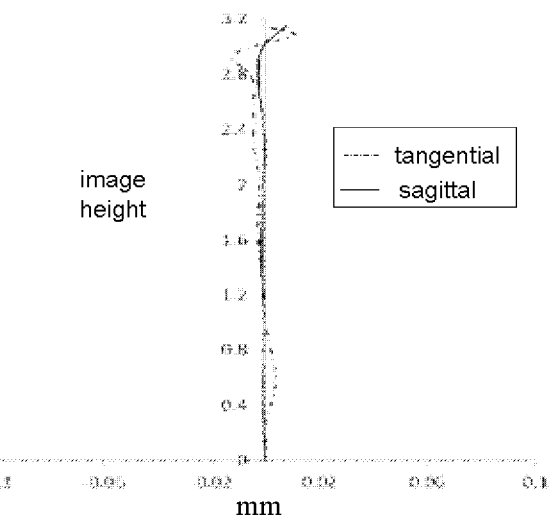
Figure 24C:
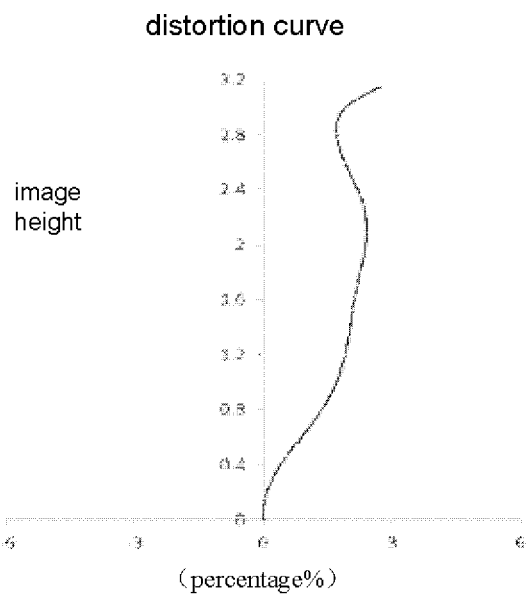
Figure 24D:
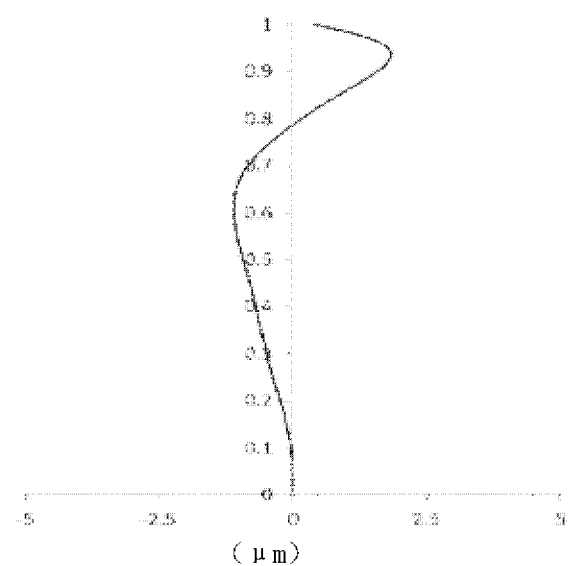

FIG. 24A illustrates a longitudinal aberration curve of the optical imaging lens assembly according to embodiment 12 to represent deviation of a convergence focal point after light with different wavelengths passes through the lens. FIG. 24B illustrates an astigmatism curve of the optical imaging lens assembly according to embodiment 12 to represent a tangential image surface curvature and a sagittal image surface curvature. FIG. 24C illustrates a distortion curve of the optical imaging lens assembly according to embodiment 12 to represent a distortion value under different viewing angles. FIG. 24D illustrates a lateral color curve of the optical imaging lens assembly according to embodiment 12 to represent deviation of different image heights on the imaging surface after the light passes through the lens. According to FIG. 24A to FIG. 24D, it can be seen that the optical imaging lens assembly provided in embodiment 12 can achieve high imaging quality.

Figure 25:
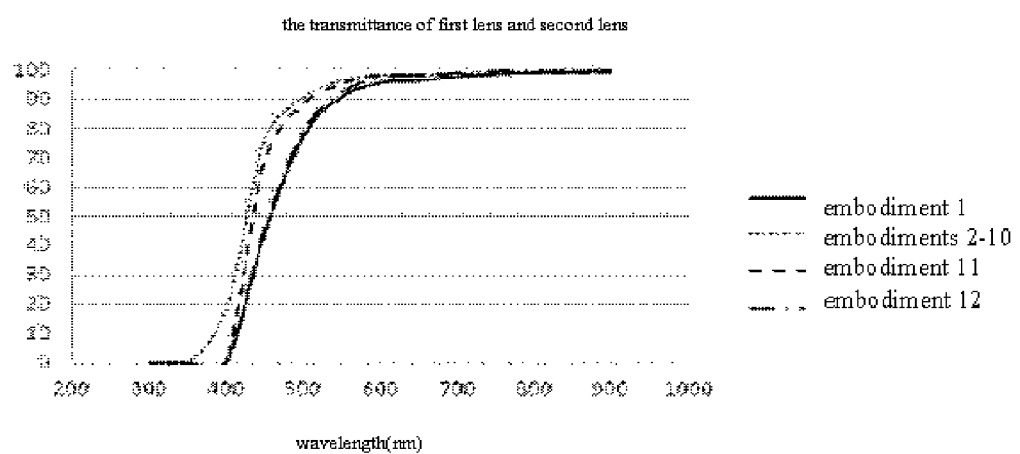
FIG. 25 illustrates transmittance information of a first lens and a second lens.

FIG. 25 illustrates transmittance information of a first lens and a second lens. From the figure, it can be seen that the transmittance $T_{500-700}$ of the first lens and the second lens in a waveband 500-700 nm satisfy the following relationships $0.89<T_{500-700}<0.995$. In addition, the transmittance $T_{700-850}$ of the first lens and the second lens in a waveband 700-850 nm satisfy the following relationships $0.98<T_{700-850}<0.998$. Under the condition that the first lens and the second lens is made of glass, the transmittance of the optical imaging lens assembly in visible light and near infrared wavebands may be enhanced. Therefore, relative illuminance of the optical imaging lens assembly may be improved.

From the above, embodiment 1 to embodiment 12 satisfy the following relationship relationships shown in Tables 25 to 28 respectively.

TABLE 25

| Conditional expression/ embodiment | 1 | 2 | 3 | 4 | 5 | 6 |
|---|---|---|---|---|---|---|
| f1 | 3.24 | 3.63 | 3.54 | 3.03 | 3.47 | 3.52 |
| f2 | −9.93 | −11.99 | −10.43 | −5.60 | −10.75 | −9.49 |
| f3 | 27.28 | 16.54 | 14.53 | 11.88 | 35.71 | 14.74 |
| f4 | 4.58 | 4.59 | 5.13 | 4.36 | 4.92 | 5.44 |
| f5 | −2.62 | −2.29 | −2.48 | −2.23 | −2.59 | −2.58 |
| f | 3.60 | 3.65 | 3.67 | 3.60 | 3.76 | 3.72 |
| TTL | 4.34 | 4.40 | 4.34 | 4.30 | 4.35 | 4.30 |
| ImgH | 3.00 | 2.95 | 3.37 | 3.00 | 3.20 | 3.10 |

TABLE 26

| Conditional expression/ embodiment | 7 | 8 | 9 | 10 | 11 | 12 |
|---|---|---|---|---|---|---|
| f1 | 3.60 | 3.65 | 3.33 | 3.36 | 3.10 | 2.73 |
| f2 | −9.18 | −9.90 | −7.72 | −7.30 | −9.65 | −7.19 |
| f3 | 14.00 | 20.88 | 12.29 | 11.30 | 30.16 | 42.83 |
| f4 | 4.64 | 4.60 | 6.24 | 5.30 | 6.17 | 5.82 |
| f5 | −2.47 | −2.58 | −2.30 | −2.53 | −2.26 | −2.53 |
| f | 3.73 | 3.70 | 3.65 | 3.77 | 3.80 | 3.70 |
| TTL | 4.45 | 4.40 | 4.30 | 4.50 | 4.20 | 4.30 |
| ImgH | 3.30 | 3.35 | 3.30 | 3.15 | 3.25 | 3.15 |

TABLE 27

| Conditional expression/ embodiment | 1 | 2 | 3 | 4 | 5 | 6 |
|---|---|---|---|---|---|---|
| \|V1-V2\| | 47.95 | 62.24 | 57.50 | 57.50 | 57.50 | 57.50 |
| f3/f4 | 5.96 | 3.60 | 2.83 | 2.72 | 7.26 | 2.71 |
| f2/R4 | −1.90 | −3.06 | −2.85 | −1.69 | −4.11 | −3.57 |
| \|N1-N2\| | 0.41 | 0.50 | 0.32 | 0.32 | 0.32 | 0.32 |
| CT3/CT2 | 2.96 | 2.54 | 2.63 | 2.28 | 1.96 | 1.84 |
| \|f/f1\| + \|f/f5\| | 2.49 | 2.60 | 2.52 | 2.80 | 2.53 | 2.50 |
| (R1 + R2)/(R1 − R2) | −1.59 | −1.64 | −1.60 | −1.00 | −1.57 | −1.60 |
| f/CT5 | 10.46 | 10.43 | 16.39 | 17.14 | 15.09 | 17.67 |
| \|f4/R8\| | 0.82 | 1.15 | 1.14 | 0.99 | 1.84 | 1.84 |
| TTL/ImgH | 1.45 | 1.49 | 1.29 | 1.43 | 1.36 | 1.39 |
| f45/f12 | −2.29 | −1.53 | −1.47 | −1.46 | −1.89 | −1.43 |
| \|f/f1\| + \|f/f2\| | 1.48 | 1.31 | 1.39 | 1.83 | 1.43 | 1.45 |
| (R3 + R4)/(R3 − R4) | 2.78 | 4.87 | 3.57 | 1.76 | 5.27 | 4.50 |
| f/(CT3 + CT4 + CT5) | 2.39 | 2.62 | 2.86 | 3.14 | 2.85 | 3.04 |

TABLE 28

| Conditional expression/ embodiment | 7 | 8 | 9 | 10 | 11 | 12 |
|---|---|---|---|---|---|---|
| \|V1-V2\| | 57.50 | 57.50 | 57.50 | 57.50 | 60.68 | 52.36 |
| f3/f4 | 3.01 | 4.54 | 1.97 | 2.13 | 4.89 | 7.36 |
| f2/R4 | −3.04 | −1.20 | −2.43 | −0.81 | −0.83 | −0.93 |
| \|N1-N2\| | 0.32 | 0.32 | 0.32 | 0.32 | 0.42 | 0.45 |
| CT3/CT2 | 2.82 | 2.29 | 2.55 | 2.50 | 2.23 | 2.76 |
| \|f/f1\| + \|f/f5\| | 2.54 | 2.44 | 2.69 | 2.61 | 2.90 | 2.82 |
| (R1 + R2)/(R1 − R2) | −1.57 | −1.59 | −1.00 | −1.37 | −1.48 | −0.98 |

TABLE 28-continued

| Conditional expression/ embodiment | 7 | 8 | 9 | 10 | 11 | 12 |
|---|---|---|---|---|---|---|
| f/CT5 | 15.53 | 15.39 | 17.19 | 17.93 | 12.29 | 9.74 |
| \|f4/R8\| | 1.30 | 1.16 | 0.51 | 1.84 | 0.99 | 0.83 |
| TTL/ImgH | 1.35 | 1.31 | 1.30 | 1.43 | 1.29 | 1.37 |
| f45/f12 | −1.65 | −2.31 | −1.01 | −1.30 | −1.14 | −1.55 |
| \|f/f1\| + \|f/f2\| | 1.44 | 1.39 | 1.57 | 1.64 | 1.62 | 1.87 |
| (R3 + R4)/(R3 − R4) | 3.81 | 0.98 | 2.91 | 0.35 | 0.54 | 0.88 |
| f/(CT3 + CT4 + CT5) | 2.55 | 3.20 | 2.93 | 2.79 | 3.14 | 2.47 |

The application also provides an imaging device, of which an electronic photosensitive element may be a CCD or a CMOS. The imaging device may be an independent imaging device such as a digital camera, and may also be an imaging module integrated into a mobile electronic device such as a mobile phone. The imaging device is provided with the abovementioned optical imaging lens assembly.

The above description is only description about the preferred embodiments of the application and adopted technical principles. Those skilled in the art should know that the scope of invention involved in the application is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the application.

What is claimed is:

1. An optical imaging lens assembly, comprising a first lens, a second lens, a third lens, a fourth lens and a fifth lens which are provided in sequence from an object side to an image side along an optical axis and have refractive powers, wherein
   the first lens has a positive refractive power;
   the fourth lens has a positive refractive power;
   the fifth lens has a negative refractive power; and
   an abbe number V1 of the first lens and an abbe number V2 of the second lens satisfy the following relationship:
   $45 < |V1-V2| < 70$,
   wherein a radius of curvature R1 of an object-side surface of the first lens and a radius of curvature R2 of an image-side surface of the first lens satisfy the following relationship:
   $-1.65 \leq (R1+R2)/(R1-R2) \leq -0.95$,
   wherein an effective focal length f2 of the second lens and a radius of curvature R4 of an image-side surface of the second lens satisfy the following relationship:
   $-4.5 \leq f2/R4 < 0$.

2. The optical imaging lens assembly as claimed in claim 1, wherein an effective focal length f3 of the third lens and an effective focal length f4 of the fourth lens satisfy the following relationship:
   $1.5 \leq f3/f4 \leq 7.5$.

3. The optical imaging lens assembly as claimed in claim 1, wherein a refractive index N1 of the first lens and a refractive index N2 of the second lens satisfy the following relationship:
   $0.3 \leq |N1-N2| \leq 0.5$.

4. The optical imaging lens assembly as claimed in claim 1, wherein a center thickness CT3 of the third lens and a center thickness CT2 of the second lens satisfy the following relationship:
   $1.5 \leq CT3/CT2 \leq 3$.

5. The optical imaging lens assembly as claimed in claim 1, wherein an effective focal length f of the optical imaging lens assembly, an effective focal length f1 of the first lens and an effective focal length f5 of the fifth lens satisfy the following relationship:
   $2 \leq |f/f1|+|f/f5| \leq 3$.

6. The optical imaging lens assembly as claimed in claim 1, wherein an effective focal length f of the optical imaging lens assembly and a center thickness CT5 of the fifth lens satisfy the following relationship:
   $9.5 \leq f/CT5 \leq 18$.

7. The optical imaging lens assembly as claimed in claim 1, wherein an effective focal length f4 of the fourth lens and a radius of curvature R8 of an image-side surface of the fourth lens satisfy the following relationship:
   $0.5 \leq |f4/R8| < 2$.

8. The optical imaging lens assembly as claimed in claim 1, wherein an axial distance TTL from an object-side surface of the first lens to an imaging surface and a half of a diagonal length ImgH of an effective pixel region on the imaging surface satisfy the following relationship:
   $TTL/ImgH \leq 1.5$.

9. The optical imaging lens assembly as claimed in claim 1, wherein a combined focal length f12 of the first lens and the second lens and a combined focal length f45 of the fourth lens and the fifth lens satisfy the following relationship:
   $-2.5 \leq f45/f12 \leq -1$.

10. The optical imaging lens assembly as claimed in claim 1, wherein an effective focal length f of the optical imaging lens assembly, an effective focal length f1 of the first lens and an effective focal length f2 of the second lens satisfy the following relationship:
    $1 \leq |f/f1|=|f/f2| \leq 2$.

11. The optical imaging lens assembly as claimed in claim 1, wherein a radius of curvature R3 of an object-side surface of the second lens and a radius of curvature R4 of an image-side surface of the second lens satisfy the following relationship:
    $0 \leq (R3+R4)/(R3-R4) \leq 5.5$.

12. The optical imaging lens assembly as claimed in claim 1, wherein an effective focal length f of the optical imaging lens assembly, a center thickness CT3 of the third lens, a center thickness CT4 of the fourth lens and a center thickness CT5 of the fifth lens satisfy the following relationship:
    $2 \leq f/(CT3+FCT4+FCT5) \leq 3.5$.

13. The optical imaging lens assembly as claimed in claim 1, wherein the first lens and the second lens are made of glass.

14. The optical imaging lens assembly as claimed in claim 1, wherein a transmittance $T_{500-700}$ of the first lens and the second lens in a waveband 500-700 nm satisfies the following relationship:
    $0.89 < T_{500-700} < 0.995$.

15. The optical imaging lens assembly as claimed in claim 1, wherein a transmittance $T_{700-850}$ of the first lens and the second lens in a waveband 700-850 nm satisfies the following relationship:
    $0.98 < T_{700-850} < 0.998$.

16. An optical imaging lens assembly, comprising a first lens, a second lens, a third lens, a fourth lens and a fifth lens which are provided in sequence from an object side to an image side along an optical axis and have refractive powers, wherein the first lens has a positive refractive power;
an image-side surface of the third lens is a convex surface;
the fourth lens has a positive refractive power;
the fifth lens has a negative refractive power; an image-side surface of the fifth lens is a concave surface; and
an abbe number V1 of the first lens and an abbe number V2 of the second lens satisfy the following relationship $45<|V1-V2|<70$,
wherein a radius of curvature R1 of an object-side surface of the first lens and a radius of curvature R2 of an image-side surface of the first lens satisfy the following relationship:
$-1.65 \leq (R1+R2)/(R1-R2) \leq -0.95$,
wherein an effective focal length f2 of the second lens and a radius of curvature R4 of an image-side surface of the second lens satisfy the following relationship:
$-4.5 \leq f2/R4 < 0$.

17. The optical imaging lens assembly as claimed in claim 16, wherein an object-side surface of the first lens is a convex surface.

18. The optical imaging lens assembly as claimed in claim 16, wherein the second lens has a negative refractive power, and an image-side surface of the second lens is a concave surface.

* * * * *